(12) United States Patent
Miyano et al.

(10) Patent No.: US 12,076,960 B2
(45) Date of Patent: Sep. 3, 2024

(54) MULTILAYER MAGNETIC SHEET

(71) Applicant: PROTERIAL, LTD., Tokyo (JP)

(72) Inventors: Kouhei Miyano, Tokyo (JP); Yasuo Kuriyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 0 days.

(21) Appl. No.: 18/118,824

(22) Filed: Mar. 8, 2023

(65) Prior Publication Data
US 2023/0302770 A1 Sep. 28, 2023

(30) Foreign Application Priority Data

| | | |
|---|---|---|
| Mar. 28, 2022 | (JP) | 2022-052071 |
| Apr. 1, 2022 | (JP) | 2022-061983 |
| Dec. 23, 2022 | (JP) | 2022-207291 |

(51) Int. Cl.
| | |
|---|---|
| *B32B 7/12* | (2006.01) |
| *B32B 15/08* | (2006.01) |
| *B32B 15/18* | (2006.01) |
| *B32B 15/20* | (2006.01) |
| *B32B 37/12* | (2006.01) |

(52) U.S. Cl.
CPC ............... *B32B 15/08* (2013.01); *B32B 7/12* (2013.01); *B32B 15/18* (2013.01); *B32B 15/20* (2013.01); *B32B 37/12* (2013.01); *B32B 2250/05* (2013.01); *B32B 2307/208* (2013.01)

(58) Field of Classification Search
CPC .................... B32B 7/03; B32B 2307/208
See application file for complete search history.

(56) References Cited

U.S. PATENT DOCUMENTS

| | | | |
|---|---|---|---|
| 2015/0123604 A1 | 5/2015 | Lee et al. | |
| 2016/0057900 A1* | 2/2016 | Polak | H01F 27/36 |
| | | | 156/60 |

(Continued)

FOREIGN PATENT DOCUMENTS

| | | |
|---|---|---|
| CN | 106910588 A | 6/2017 |
| CN | 209087527 U | 7/2019 |
| EP | 2797092 A1 | 10/2014 |

(Continued)

OTHER PUBLICATIONS

Extended European Search Report issued in EP Application No. 23159869.9; dated Aug. 8, 2023; 9 pages.

*Primary Examiner* — Adam Krupicka
(74) *Attorney, Agent, or Firm* — Meunier Carlin & Curfman LLC

(57) ABSTRACT

A multilayer magnetic sheet comprises laminate substrates each comprising two or more stacked layers of band-shaped magnetic ribbons. The laminate substrates are arranged side by side in a plate shape in a direction in which long sides of the laminate substrates are adjacent to each other and short sides of the laminate substrates extend. The plate shapes each provided by the laminate substrates arranged side by side are stacked in a thickness direction of the laminate substrate. Ten or more layers of the magnetic ribbons are stacked in total. Positions of the long sides of the laminate substrates adjacent to each other in a direction in which the laminate substrates are stacked are different and separated from each other by 0.5 mm or more in the direction in which the short sides extend.

11 Claims, 15 Drawing Sheets

(56) References Cited

U.S. PATENT DOCUMENTS

2019/0296432 A1    9/2019  Lim et al.
2022/0293313 A1    9/2022  Kuriyama

FOREIGN PATENT DOCUMENTS

| JP | 2008112830 A | 5/2008 |
|----|--------------|--------|
| JP | 2015505166 A | 2/2015 |
| JP | 2019522355 A1 | 8/2019 |
| WO | 2020235642 A1 | 11/2020 |

* cited by examiner

MULTILAYER MAGNETIC SHEET

CROSS-REFERENCE TO RELATED APPLICATIONS

This application claims the benefit of Japanese Patent Application No. 2022-052071 filed Mar. 28, 2022 with the Japan Patent Office, Japanese Patent Application No. 2022-061983 filed Apr. 1, 2022 with the Japan Patent Office, and Japanese Patent Application No. 2022-207291 filed Dec. 23, 2022 with the Japan Patent Office, and the entire disclosures of Japanese Patent Application No. 2022-052071, Japanese Patent Application No. 2022-061983, and Japanese Patent Application No. 2022-207291 are incorporated herein by reference.

BACKGROUND

The present disclosure relates to a multilayer magnetic sheet that can be used in a contactless charging device for charging a secondary battery of an automobile, for example.

In recent years, contactless charging in which both a power supply side and a power reception side are each provided with a transmission coil and charging is performed by power transmission using electromagnetic induction has attracted attention. In the contactless charging, a magnetic flux generated in a primary transmission coil of a power feeding device generates an electromotive force in a secondary transmission coil of a power receiving device through casings of the power feeding device and the power receiving device, whereby a power is supplied.

For example, the contactless charging has been spreading to electronic devices such as tablet type information terminals, music players, smartphones, and mobile phones. The contactless charging is a technology applicable to electronic devices other than those described above, electric vehicles, and drones. The technology is also applicable to transport vehicles such as forklifts and automated guided vehicles (AGVs), railways, trams, and the like.

In order to increase power transmission efficiency in contactless charging, there is a case where a transmission coil is provided with a magnetic sheet as a coil yoke on a side opposite to contact surfaces between the power feeding device and the power receiving device. The magnetic sheet arranged in this manner has a role as a magnetic shielding material for preventing leakage of a magnetic flux during charging, a role as a yoke member for refluxing a magnetic flux generated in a coil during charging, and the like.

As a method of manufacturing the above-described magnetic sheet, various methods have been proposed (see, for example, see Japanese Unexamined Patent Application Publication No. 2008-112830 (Patent Document 1), Japanese Unexamined Patent Application Publication (Translation of PCT Application) No. 2015-505166 (Patent Document 2), International Publication No. 2020-235642 (Patent Document 3)). Patent Documents 1 to 3 disclose a manufacturing method including a process of dividing a thin plate-shaped magnetic body included in a magnetic sheet, a ribbon of a noncrystalline alloy or a nanocrystal grain alloy, or the like (hereinafter, also expressed as "alloy ribbon") into a plurality of pieces for the purpose of improving a Q value or reducing an eddy current loss.

Compared with electronic devices such as smartphones, in the case of contactless charging used in electric vehicles or the like, it is difficult to arrange a primary coil and a secondary coil close to each other. For example, it is necessary to electromagnetically couple the primary coil and the secondary coil in a state where there is a relatively wide interval.

The power transmitted between the primary coil and the secondary coil also needs to be relatively large. Specifically, a current flowing through the primary coil also becomes relatively large, and the magnetic flux between the primary coil and the secondary coil also needs to be relatively large.

Therefore, the primary coil and the secondary coil become relatively large, and there is a problem that the magnetic sheet used for electronic devices such as smartphones is insufficient in size. Since the magnetic flux becomes relatively large, there is a problem that the magnetic flux is liable to leak to other devices.

The alloy ribbon included in the magnetic sheet has a shape extending in a band shape. There has been a problem that a width of the alloy ribbon, which is a dimension in a direction orthogonal to a longitudinal direction, is narrow for contactless charging used in electric vehicles and the like.

Regarding this, a technique is also known in which a plurality of alloy ribbons are arranged in a plate shape, and the plurality of alloy ribbons arranged in the plate shapes are further stacked in a thickness direction (see, for example, Japanese Unexamined Patent Application Publication No. 2019-522355 (Patent Document 4)). In the technique described in Patent Document 4, the width of the surface on which the alloy ribbons are arranged can be easily widened.

SUMMARY

The technique described in Patent Document 4 is a method of stacking single-layer alloy ribbons. Therefore, there is a problem that the number of man-hours becomes large in order to configure a magnetic sheet (also expressed as "multilayer magnetic sheet") in which 15 or more layers of alloy ribbons are stacked.

The present disclosure provides a multilayer magnetic sheet with which man-hours are less likely to become large.

A multilayer magnetic sheet according to the present disclosure comprises laminate substrates each comprising two or more stacked layers of band-shaped magnetic ribbons and having a short side and a long side. The laminate substrates are arranged side by side in a plate shape in a direction in which the long sides of the laminate substrates are adjacent to each other and the short sides of the laminate substrates extend. The plate shapes each provided by the laminate substrates arranged side by side are stacked in a thickness direction of the laminate substrate. Ten or more layers of the magnetic ribbons are stacked in total. Positions of the long sides of the laminate substrates adjacent to each other in a direction in which the laminate substrates are stacked are different and separated from each other by 0.5 mm or more in the direction in which the short sides extend.

With the multilayer magnetic sheet of the present disclosure, a wide multilayer magnetic sheet in which a plurality of laminate substrates each comprising two or more stacked layers of magnetic ribbons are arranged in a plate shape and stacked in a thickness direction is configured. Since the plurality of laminate substrates are arranged in the plate shape and the plurality of laminate substrates in the plate shapes are stacked in the thickness direction, the number of man-hours in manufacturing is less likely to become large as compared with a configuration in which magnetic ribbons are arranged side by side and stacked.

Positions of the long sides of the plurality of laminate substrates differ from each other by 0.5 mm or more between the laminate substrates adjacent to each other in a stacking direction. In other words, when viewed in the stacking direction, gaps between the laminate substrates arranged to be adjacent the same surface are not aligned (also expressed as not continuous). Since the gaps are not continuous when viewed in the stacking direction, it is easy to prevent deterioration of magnetic characteristics in the multilayer magnetic sheet.

With the multilayer magnetic sheet of the present disclosure, the multilayer magnetic sheet has a configuration in which a plurality of laminate substrates comprising two or more stacked layers of magnetic ribbons are arranged in a plate shape and stacked in a thickness direction. Therefore, there is an effect that the number of man-hours in manufacturing is less likely to become large.

BRIEF DESCRIPTION OF THE DRAWINGS

Example embodiments of the present disclosure will be described hereinafter by way of examples with reference to the accompanying drawings, in which.

DETAILED DESCRIPTION OF EXEMPLARY EMBODIMENTS

First Embodiment

A multilayer magnetic sheet 400 according to a first embodiment of the present disclosure will be described with reference to FIGS. 1 to 13. The multilayer magnetic sheet 400 according to the present embodiment is used for a contactless charging device. The multilayer magnetic sheet 400 may be used for a power feeding device of a charging device or may be used for a power receiving device.

The present embodiment will be described by applying the present disclosure to an example in which the multilayer magnetic sheet 400 is used for contactless charging of devices having higher power consumption than information processing devices and electronic devices such as smartphones. For example, the present embodiment will be described by applying the present disclosure to an example in which the multilayer magnetic sheet 400 is used for contactless charging of a moving body such as an automobile. The multilayer magnetic sheet 400 may be used for contactless charging of information processing devices, electronic devices, or the like. The present disclosure is also applicable to transport vehicles such as forklifts and AGVs, railways, trams, and the like.

Figure 1:
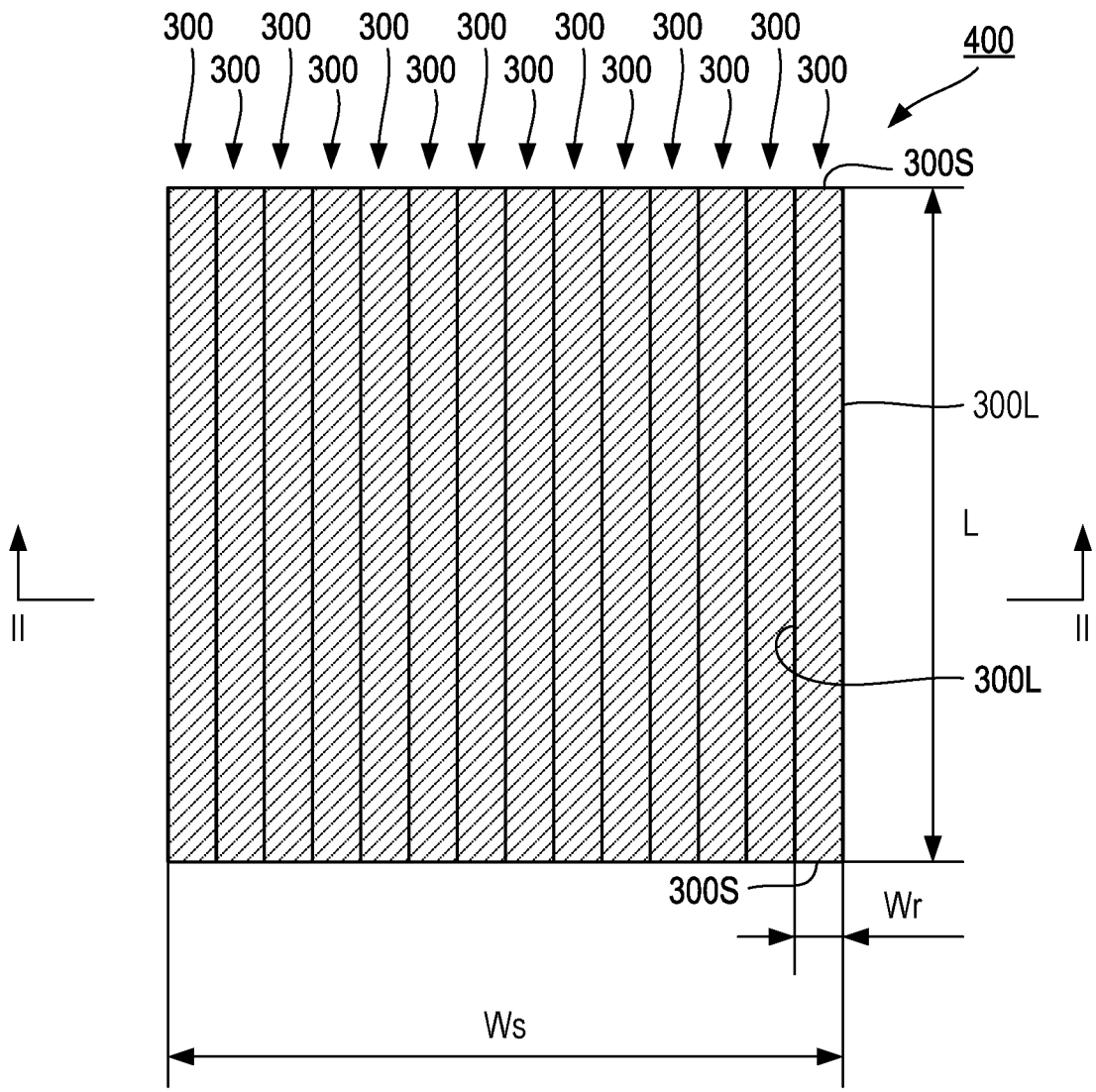
FIG. 1 is a plan view illustrating a structure of a multilayer magnetic sheet according to a first embodiment of the present disclosure.
Figure 2:
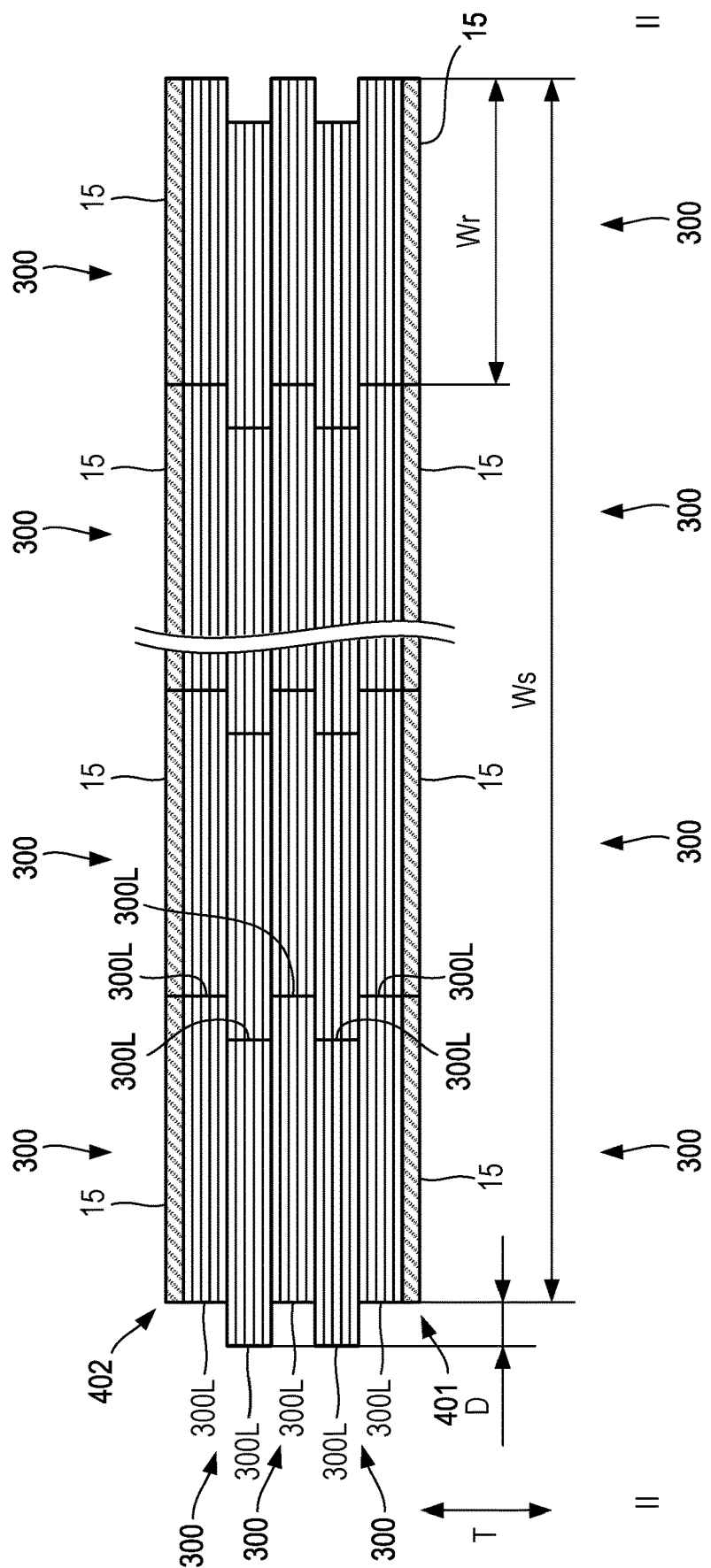
FIG. 2 is a cross-sectional view taken along the line II-II illustrating the structure of the multilayer magnetic sheet.

FIG. 1 is a plan view illustrating a structure of the multilayer magnetic sheet 400. FIG. 2 is a cross-sectional view taken along the line II-II for illustrating the structure of the multilayer magnetic sheet 400.

As shown in FIGS. 1 and 2, the multilayer magnetic sheet 400 has a configuration in which a plurality of laminate substrates 300 each formed in a band shape are arranged side by side in a plate shape, and the plurality of laminate substrates 300 arranged side by side in the plate shapes are stacked and arranged in a thickness direction (a direction indicated by an arrow mark T in the drawings). The thickness direction is also expressed as a direction in which the laminate substrates 300 are stacked. The laminate substrate 300 has a band shape or a rectangular shape having two long sides 300L and two short sides 300S.

As shown in FIG. 1, the multilayer magnetic sheet 400 has a plate shape or a sheet shape formed in a rectangular shape in a plan view. The plurality of laminate substrates 300 are arranged such that the long sides 300L are arranged adjacently to each other, and are arranged side by side in a direction in which the short sides 300S extend. An interval between the laminate substrates 300 arranged side by side in the direction in which the short sides 300S extend is preferably between 0 mm and 5 mm inclusive.

In the multilayer magnetic sheet 400, it is preferable that the laminate substrates 300 are arranged side by side in number between 2 and 20 inclusive in the direction in which the short sides 300S extend. The laminate substrates 300 may be arranged side by side in number of 20 or more. The present embodiment will be described by applying the present disclosure to an example in which 14 laminate substrates 300 are arranged side by side.

The present embodiment will be described by applying the present disclosure to an example in which one laminate substrate 300 is arranged in a direction in which the long side 300L extends. The number of the laminate substrates 300 arranged in the direction in which the long side 300L extends may be more than 1.

The present embodiment will be described by applying the present disclosure to an example in which a length L of the laminate substrate 300 in the direction in which the long side 300L extends is in a range of between 100 mm and 1000 mm inclusive, and a width Wr in the direction in which the short side 300S extends is in a range of between 10 mm and 100 mm inclusive. The length L of the laminate substrate 300 in the direction in which the long side 300L extends may be other than the above-described range, and the width Wr in the direction in which the short side 300S extends may be other than the above-described range.

The present embodiment will be described by applying the present disclosure to an example in which the length L of the multilayer magnetic sheet 400 is in the range of between 100 mm and 1000 mm inclusive and a width Ws is in the range of between 100 mm and 1000 mm inclusive.

Here, the length L is a dimension in a direction in which the long side 300L of the laminate substrate 300 constituting the multilayer magnetic sheet 400 extends, and the width Ws is a dimension in a direction in which the short side 300S of the laminate substrate 300 extends. The length L of the multilayer magnetic sheet 400 may be other than the above-described range, and the width Ws may be other than the above-described range.

As shown in FIG. 2, the multilayer magnetic sheet 400 has a configuration in which the plurality of laminate substrates 300 are stacked in the thickness direction in the cross-sectional view. The multilayer magnetic sheet 400 is provided with resin sheets 15. The resin sheet 15 is a film-like member formed using a resin arranged at each of a first stacking end part 401 and a second stacking end part 402, which are outer end parts in the thickness direction.

The number of the laminate substrates 300 stacked in the thickness direction in the multilayer magnetic sheet 400 is preferably between 2 and 20 inclusive. The present embodiment has a configuration in which five laminate substrates 300 are stacked in the thickness direction. The number of the stacked laminate substrates 300 may be less than or more than 5. The number of the laminate substrates 300 stacked in the thickness direction in the multilayer magnetic sheet 400 may be more than 20.

Positions of the long sides 300L of the laminate substrates 300 adjacent to each other in the thickness direction, in other words, the direction in which the laminate substrates 300 are stacked, differ from each other by a distance D in the direction in which the short sides 300S extend. The distance D is equal to or more than 0.5 mm.

The distance D is preferably equal to or more than 1 mm. The distance D is more preferably equal to or more than 2 mm, and more preferably equal to or more than 3 mm.

When the distance D is less than 0.5 mm, there is a strong tendency that magnetic gaps generated between the laminate substrates 300 (magnetic gaps between magnetic ribbons 20) are aligned in the stacking direction, and magnetic characteristics of the multilayer magnetic sheet 400 are deteriorated. For example, magnetic permeability is lowered and the Q value becomes small.

As the distance D is increased, the magnetic gaps generated between the laminate substrates 300 (magnetic gaps between the magnetic ribbons 20) are less aligned in the stacking direction, and the magnetic characteristics can be improved (for example, magnetic permeability is higher, and Q is larger). An increase in the distance D also improves productivity.

The distance D can be set up to half the width of the laminate substrate 300. When the laminate substrates 300 having the same width are used, as the distance D increases, positional deviation of ends between the laminate substrates 300 increases at ends (both ends in the width Ws direction) of the multilayer magnetic sheet 400. Therefore, the value equal to or less than 10 mm is preferable as the distance D. The ends may be cut and aligned. In this case, the problem of positional deviation of the ends between the laminate substrates 300 at the ends (both ends in the width Ws direction) of the multilayer magnetic sheet 400 can be solved. The end may be cut to form the multilayer magnetic sheet 400 having a desired size.

By using a plurality of laminate substrates 300 having different widths, it is possible to align the ends of the laminate substrates 300 at the ends (both ends in the width Ws direction) of the multilayer magnetic sheet 400.

FIG. 2 shows an example in which positions of the long sides 300L of the laminate substrates 300 adjacent to each other in the stacking direction thereof are shifted in alternating directions. Specifically, a position of the long side 300L of the laminate substrate 300 in a second layer stacked on the laminate substrate 300 in the lowermost first layer in FIG. 2 is shifted from a position of the long side 300L of the laminate substrate 300 in the lowermost first layer by the distance D in the left direction. A position of the long side 300L of the laminate substrate 300 in a third layer is shifted from the position of the long side 300L of the laminate substrate 300 in the second layer by the distance D in the opposite right direction. For the laminate substrates 300 in a fourth layer and a fifth layer, similarly, the positions of the long sides 300L are shifted in the alternating directions.

Figure 3:
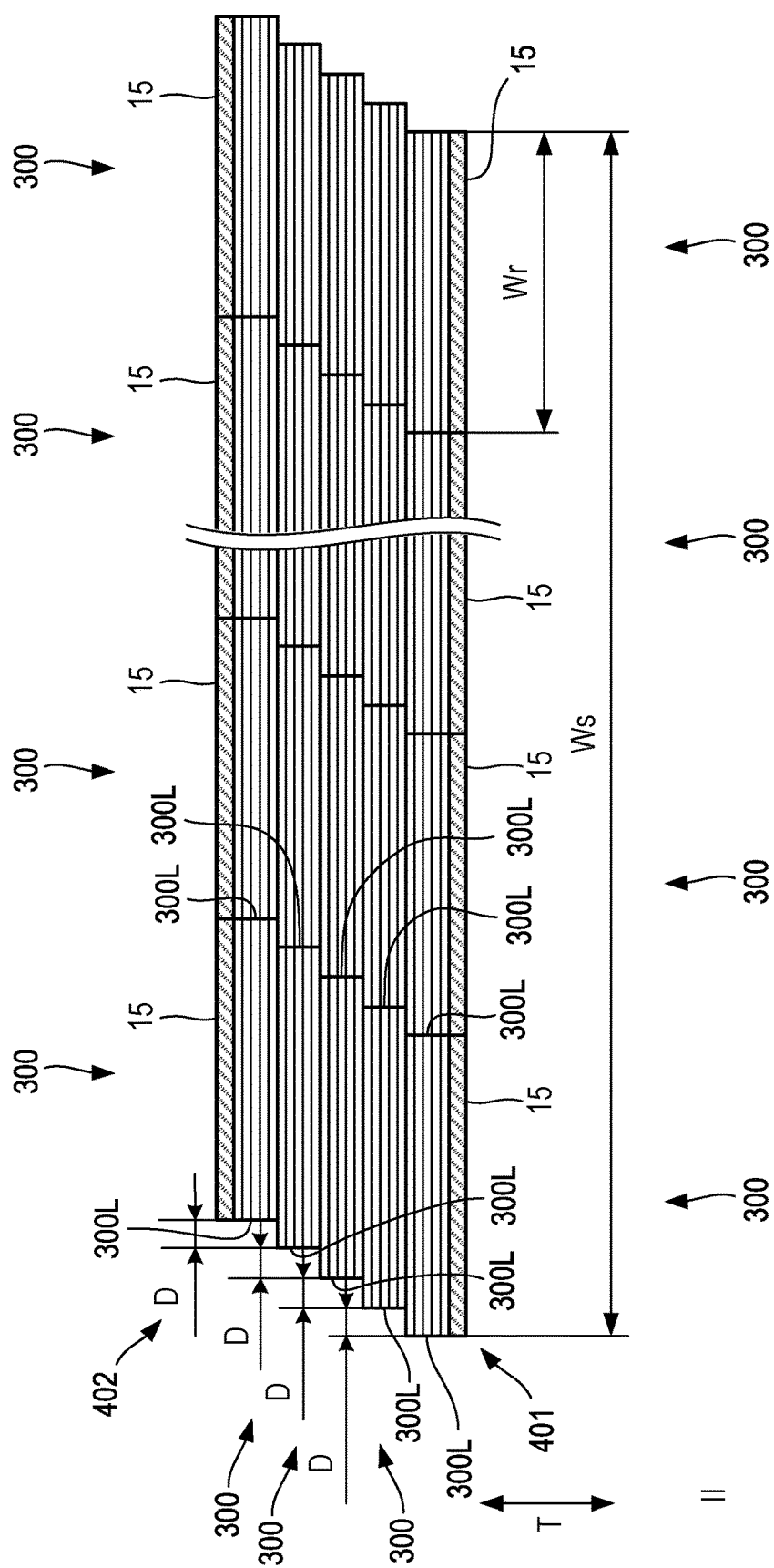
FIG. 3 is a cross-sectional view taken along the line II-II illustrating another structure of the multilayer magnetic sheet.

FIG. 3 is a cross-sectional view taken along the line II-II for illustrating another structure of the multilayer magnetic sheet 400.

FIG. 3 shows an example in which positions of the long sides 300L of the laminate substrates 300 adjacent to each other in the stacking direction thereof are shifted in the same direction. Specifically, a position of the long side 300L of the laminate substrate 300 in a second layer stacked on the laminate substrate 300 in the lowermost first layer in FIG. 3 is shifted from a position of the long side 300L of the laminate substrate 300 in the lowermost first layer by the distance D in the right direction. A position of the long side 300L of the laminate substrate 300 in a third layer is shifted from the position of the long side 300L of the laminate substrate 300 in the second layer by the distance D in the same right direction. For the laminate substrates 300 in a fourth layer and a fifth layer, similarly, the positions of the long sides 300L are shifted in the same direction.

In the structures described with reference to FIGS. 2 and 3, the position of the long side 300L of the laminate substrate 300 is changed for each layer of the laminate substrate 300. Alternatively, for example, layers in which the positions of the long sides 300L are the same (D=0) between the laminate substrate 300 adjacent to each other in the stacking direction may partially exist.

Figure 4:
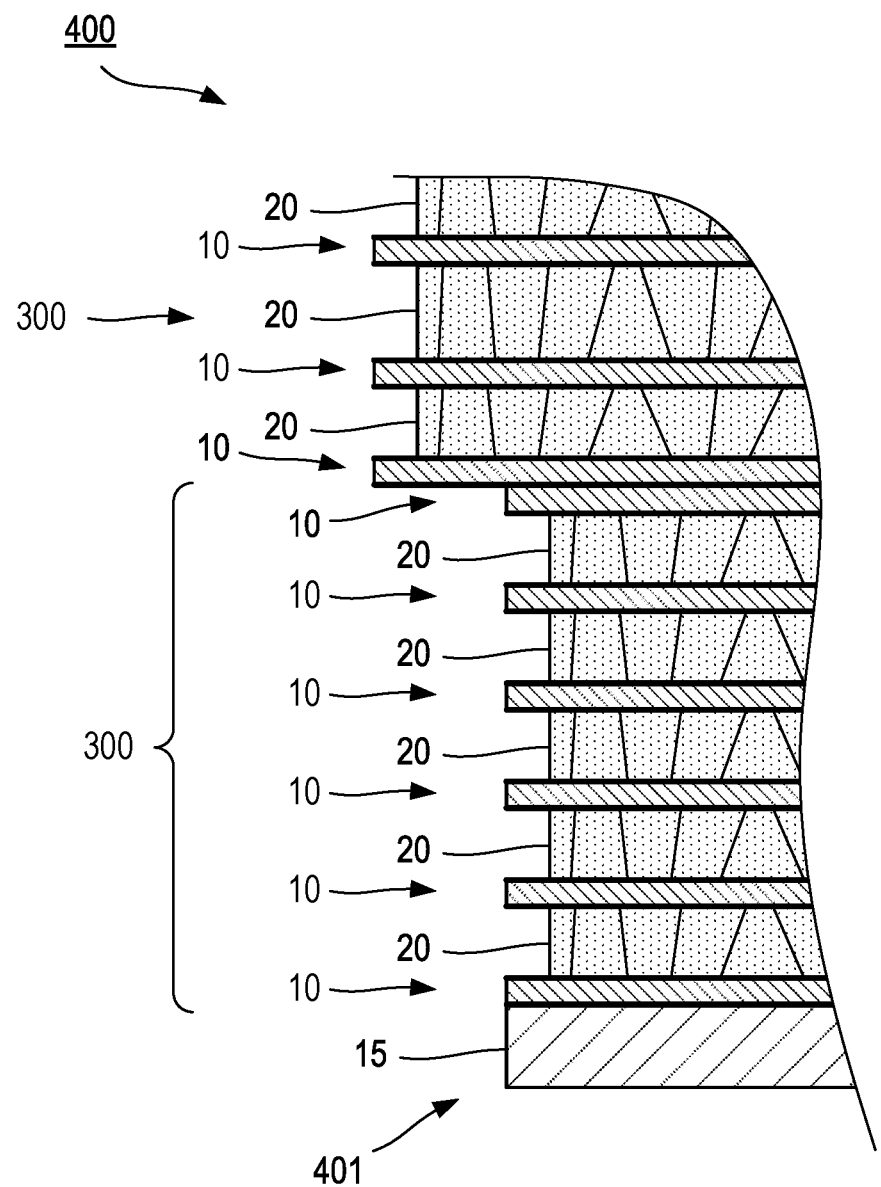
FIG. 4 is a partially enlarged cross-sectional view illustrating a configuration of a laminate substrate.

FIG. 4 is a partially enlarged cross-sectional view illustrating a configuration of the laminate substrate 300.

The laminate substrate 300 has a multilayer structure in which a plurality of adhesive layers 10 and a plurality of magnetic ribbons 20 are alternately stacked. In the present embodiment, as shown in FIG. 4, a description will be given about an example having a multilayer structure in which 6 layers of the adhesive layers 10 and 5 layers of the magnetic ribbons 20 are alternately stacked.

Specifically, the multilayer structure comprises the adhesive layer 10, the magnetic ribbon 20, the adhesive layer 10, the magnetic ribbon 20, the adhesive layer 10, the magnetic ribbon 20, the adhesive layer 10, the magnetic ribbon 20, the adhesive layer 10, the magnetic ribbon 20, and the adhesive layer 10 stacked in this order.

The number of the magnetic ribbons 20 included in the laminate substrate 300 may be 5 as described above, or may be any number of 2 or more other than 5. The number of the magnetic ribbons 20 is preferably 3 or more, preferably 4 or more, and preferably 5 or more. An upper limit may be any number of layers as long as manufacturing is possible. For example, in the case of using a manufacturing device described with reference to FIG. 12, the number of the layers is preferably between 2 and 20 inclusive.

The total layers of the magnetic ribbons 20 stacked in the multilayer magnetic sheet 400 are preferably 10 or more layers, and more preferably 15 or more layers. The total layers of the stacked magnetic ribbons 20 are preferably 200 or less layers.

Two layers of the adhesive layers 10 are successively stacked at the position where the laminate substrates 300 are adjacent to each other in the stacking direction. In other parts, two layers of the adhesive layers 10 may be stacked. Three or more layers of the adhesive layers 10 may be stacked, but in that case, the entire thickness becomes large. Therefore, two or less layers are preferable when the adhesive layers 10 are stacked. One layer of the resin sheet 15 is stacked on each of the laminate substrates 300 arranged at the first stacking end part 401 and the second stacking end part 402. In other words, the multilayer magnetic sheet 400 is provided with the total of two layers of the resin sheets 15. The resin sheets 15 are attached to the outermost layers of the adhesive layers 10.

The resin sheet 15 may not be stacked on the first stacking end part 401 or the second stacking end part 402. The magnetic ribbon 20 may be exposed, or for example, an amorphous alloy ribbon, a nanocrystalline alloy ribbon, another magnetic material, a metal foil such as aluminum, a resin sheet, or the like may be attached to the first stacking end part 401 or the second stacking end part 402.

Figure 5:
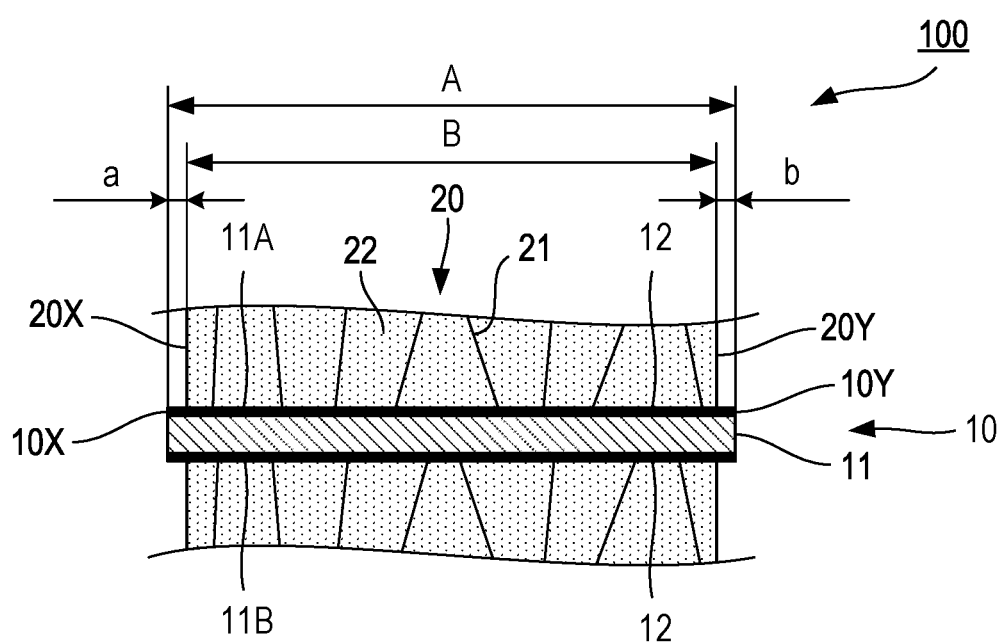
FIG. 5 is a partially enlarged cross-sectional view illustrating configurations of an adhesive layer and a magnetic ribbon.

FIG. 5 is a partially enlarged cross-sectional view illustrating configurations of the adhesive layer 10 and the magnetic ribbon 20.

As shown in FIG. 5, the adhesive layer 10 is a member to which the magnetic ribbon 20 is attached. The adhesive layer 10 is a member formed in an elongated shape, for example, a film-like member formed in a rectangular shape. The adhesive layer 10 comprises a support 11 and an adhesive 12 as main components.

The support 11 is a band-like film member formed in an elongated shape, for example, a film member formed in a rectangular shape. The support 11 is formed using a flexible resin material. As the resin material, polyethyleneterephthalate (PET) can be used.

The adhesive 12 is provided in a film shape or a layer shape on each of a first surface 11A and a second surface 11B of the support 11.

As the adhesive 12, for example, a pressure sensitive adhesive can be used. For example, a known adhesive such as an acrylic adhesive, a silicone adhesive, a urethane adhesive, a synthetic rubber, or a natural rubber can be used as the adhesive 12. The acrylic adhesive is preferable as the adhesive 12 because it is excellent in heat resistance and moisture resistance and has a wide range of materials that can be attached.

The adhesive 12 is provided in a layer shape on each of the first surface 11A and the second surface 11B of the support 11. The present embodiment will be described by applying the present disclosure to an example in which the adhesive 12 is provided on each of the entire surfaces of the first surface 11A and the second surface 11B of the support 11.

The magnetic ribbon 20 is a ribbon formed in an elongated band shape using a magnetic material. Cracks 21 are formed in the magnetic ribbon 20. The magnetic ribbon 20 is divided into a plurality of small pieces 22 by the cracks 21. In other words, the magnetic ribbon 20 comprises the plurality of small pieces 22. The cracks 21 refer to magnetic gaps formed in the magnetic ribbon 20, and include, for example, splits and/or fissures of the magnetic ribbon 20.

By forming the cracks 21 in the magnetic ribbon 20, the Q value can be easily improved when the multilayer magnetic sheet 400 is used as a magnetic material for an inductor. In a case where the multilayer magnetic sheet 400 is used as a magnetic body for magnetic shielding, it is easy to divide a current path of the magnetic ribbon 20 to reduce an eddy current loss.

As a material for forming the magnetic ribbon 20, an alloy having a Fe or Co alloy composition can be used, and a nanocrystalline alloy or an amorphous alloy can be used. In particular, the magnetic ribbon 20 is preferably a ribbon formed using a nanocrystalline alloy as a material (hereinafter, also expressed as "nanocrystalline alloy ribbon").

As the nanocrystalline alloy ribbon, it is possible to use a nanocrystalline alloy ribbon obtained by subjecting a noncrystalline alloy ribbon capable of nanocrystallization to heat treatment for nanocrystallization. At the time of heat treatment for nanocrystallization, it is preferable to perform heat treatment for nanocrystallization in a state where tension is applied to the noncrystalline alloy ribbon capable of nanocrystallization. The ribbon formed using an amorphous alloy as a material is also expressed as an amorphous alloy ribbon or a noncrystalline alloy ribbon.

The nanocrystalline alloy ribbon preferably has a composition represented by a following general formula.

$$(Fe_{1-a}M_a)_{100-x-y-z-\alpha-\beta-\gamma}Cu_xSi_yB_zM'_\alpha M''_\beta X_\gamma (atom\ \%)$$ 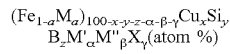  General Formula:

In the above general formula, M is Co and/or Ni, M' is at least one type of element selected from the group consisting of Nb, Mo, Ta, Ti, Zr, Hf, V, Cr, Mn, and W, M" is at least one type of element selected from the group consisting of Al, a platinum group element, Sc, a rare earth element, Zn, Sn, and Re, X is at least one type of element selected from the group consisting of C, Ge, P, Ga, Sb, In, Be, and As, and a, x, y, z, $\alpha$, $\beta$, and $\gamma$ satisfy $0 \le a \le 0.5$, $0.1 \le x \le 3$, $0 \le y \le 30$, $0 \le z \le 25$, $5 \le y+z \le 30$, $0 \le \alpha \le 20$, $0 \le \beta \le 20$, and $0 \le \gamma \le 20$, respectively.

Preferably, in the general formula, a, x, y, z, $\alpha$, $\beta$, and $\gamma$ satisfy $0 \le a \le 0.1$, $0.7 \le x \le 1.3$, $12 \le y \le 17$, $5 \le z \le 10$, $1.5 \le \alpha \le 5$, $0 \le \beta \le 1$, and $0 \le \gamma \le 1$, respectively.

The present embodiment will be described by applying the present disclosure to an example in which the magnetic ribbon 20 is a ribbon (FT-3 manufactured by Hitachi Metals, Ltd. (now, Proterial, Ltd.)), which is a Fe—Cu—Nb—Si—B based nanocrystalline alloy. The magnetic ribbon 20 may be a nanocrystalline alloy ribbon having another composition represented by the above general formula, or may be an amorphous alloy ribbon.

The magnetic ribbon 20 is mechanically more brittle when the magnetic ribbon 20 is a nanocrystalline alloy ribbon than when the magnetic ribbon 20 is an amorphous alloy ribbon. In a case where the magnetic ribbon 20 is a nanocrystalline alloy ribbon, when an external force is directly applied to the magnetic ribbon 20 to form the cracks 21, the cracks 21 can be formed with a small external force.

When the magnetic ribbon 20 is a nanocrystalline alloy ribbon, the cracks 21 can be formed without substantially forming irregularities on a surface of the magnetic ribbon 20. Therefore, a planar state of the magnetic ribbon 20 can be made favorable. Thus, a temporal change of the shape of the magnetic ribbon 20 generated after the magnetic ribbon 20 and the adhesive layer 10 are attached to each other to form the laminate substrate 300 is reduced. Thus, it is possible to suppress a temporal change in magnetic characteristics in the laminate substrate 300 and the magnetic ribbon 20.

As the magnetic ribbon 20, it is possible to use an alloy ribbon that is manufactured by roll rapid cooling and that has a thickness of 100 μm or less, for example. The thickness of the magnetic ribbon 20 is preferably equal to or less than 50 μm, more preferably equal to or less than 30 μm, still more preferably equal to or less than 25 μm, and particularly preferably equal to or less than 20 μm. Since it becomes difficult to handle the magnetic ribbon 20 if the thickness is thin, the thickness of the magnetic ribbon 20 is preferably equal to or more than 5 μm, and more preferably equal to or more than 10 μm.

The magnetic ribbon 20 is attached to the adhesive 12 of the adhesive layer 10. In the present embodiment, the magnetic ribbon 20 is attached to the adhesive 12 provided on the first surface 11A of the adhesive layer 10. The magnetic ribbon 20 and the adhesive layer 10 have shapes that satisfy a relationship of a following formula.

$$0.2 \text{ mm} \leq (\text{width } A - \text{width } B) \leq 3 \text{ mm}$$

The width A is a dimension related to the adhesive layer 10, and more preferably a dimension related to a region in the adhesive layer 10 provided with the adhesive 12 to which the magnetic ribbon 20 is attached. The width B is a dimension related to the magnetic ribbon 20. When the adhesive 12 is provided on the entire surface of the support 11 of the adhesive layer 10, the width A is a dimension related to the adhesive layer 10 or the support 11.

Here, a lower limit of (width A−width B) is preferably 0.5 mm, and more preferably 1.0 mm. An upper limit of (width A−width B) is preferably 2.5 mm, and more preferably 2.0 mm.

The magnetic ribbon 20 and the adhesive layer 10 are arranged so as to satisfy a relationship of another following formula.

$$0 \text{ mm} < \text{gap } a, \text{ and } 0 \text{ mm} < \text{gap } b$$

The gap a and the gap b are distances from ends of the adhesive layer 10 to ends of the magnetic ribbon 20. Specifically, the gap a is a distance from a first adhesive layer end 10X of the adhesive layer 10 to a first ribbon end 20X of the magnetic ribbon 20. The gap b is a distance from a second adhesive layer end 10Y of the adhesive layer 10 to a second ribbon end 20Y of the magnetic ribbon 20.

The first ribbon end 20X is an end of the magnetic ribbon 20 on the same side as the first adhesive layer end 10X. The second adhesive layer end 10Y is an end of the adhesive layer 10 on the opposite side to the first adhesive layer end 10X. The second ribbon end 20Y is an end of the magnetic ribbon 20 on the same side as the second adhesive layer end 10Y.

The width A, the width B, the gap a, and the gap b are dimensions in a direction intersecting, or more preferably orthogonal to, the longitudinal direction of the laminate substrate 300. The longitudinal direction of the laminate substrate 300 and the longitudinal direction of the adhesive layer 10 are the same direction. The longitudinal direction of the laminate substrate 300 and the longitudinal direction of the magnetic ribbon 20 are the same direction.

In the present embodiment, by applying the present disclosure to an example in which the length of the magnetic ribbon 20 in the longitudinal direction is 20,000 m, a manufacturing method of a multilayer magnetic sheet will be described. The present embodiment will be described by applying the present disclosure to an example in which the width A, which is a dimension related to the adhesive layer 10 or the support 11, is 32 mm, the width B, which is a dimension related to the magnetic ribbon 20, is 30 mm, and the width A−the width B is 2 mm.

The resin sheet 15 is a film-like member formed using a resin, and is also expressed as a protective film, a release film, or a liner. The resin sheet 15 is a member used for protection of the magnetic ribbon 20, the laminate substrate 300, and the multilayer magnetic sheet 400.

The resin sheet 15 has a function of suppressing an unnecessary increase of the cracks 21 (or cracks connecting a plurality of cracks 21 in a mesh manner) described below caused by application of an unintended external force to the magnetic ribbon 20. The resin sheet 15 has a function of suppressing the small pieces 22 of the magnetic ribbon 20 from falling off and a function of suppressing the magnetic ribbon 20 from rusting.

The resin sheet 15 has a function of suppressing occurrence of unnecessary deformation when the multilayer magnetic sheet 400 is processed into a predetermined shape. Examples of the unnecessary deformation can include surface irregularities. The resin sheet 15 may be stacked together with the adhesive layer 10 as described above, or may be stacked alone.

The resin sheet 15 is preferably a film-like member formed using a resin, and more preferably a member formed using a resin having elasticity. When the resin sheet 15 is a member formed using a resin, it becomes easy to suppress generation of irregularities on the surface of the magnetic ribbon 20 with the elastic force of the resin sheet 15.

Even if irregularities occur on the surface of the magnetic ribbon 20, the irregularities of the magnetic ribbon 20 easily become flat due to the elastic force of the resin sheet 15. Thus, the planar state of the magnetic ribbon 20 can be made favorable with less irregularities. Thus, the temporal change of the magnetic characteristics in the multilayer magnetic sheet 400 can be easily reduced.

As the resin sheet 15, a resin having a lower limit of a tensile elastic modulus of 0.1 GPa can be used. When the tensile elastic modulus of the resin is 0.1 GPa or more, the above effect is obtained easily and sufficiently. The lower limit of the tensile elastic modulus is preferably 0.5 GPa, and more preferably 1.0 GPa.

An upper limit of the tensile elastic modulus of the resin is preferably 10 GPa. If the upper limit exceeds 10 GPa, deformation of the alloy ribbon may be suppressed when the cracks 21 described below are formed. The upper limit of the tensile elastic modulus is preferably 9 GPa, and more preferably 8 GPa.

The resin sheet 15 preferably has a thickness of between 1 μm and 100 μm inclusive. When the thickness of the resin sheet 15 increases, the multilayer magnetic sheet 400 becomes less likely to deform. Thus, it may be difficult to arrange the multilayer magnetic sheet 400 along a curved surface or a bent surface.

When the thickness of the resin sheet 15 is less than 1 μm, deformation of the resin sheet 15 becomes easy. Thus, there is a case where handling of the resin sheet 15 becomes difficult, and the function of supporting the magnetic ribbon 20 by the resin sheet 15 is not sufficiently obtained. When the resin sheet 15 is a protective film, there is a case where the strength of the resin sheet 15 becomes weak, and the function of protecting the magnetic ribbon 20 and the like becomes insufficient.

As the resin of the resin sheet 15, it is possible to use, for example, polyethylene terephthalate (PET), polyimide, polyetherimide, polyethylene naphthalate, polypropylene, polyethylene, polystyrene, polycarbonate, polysulfone, polyetherketone, polyvinyl chloride, polyvinyl alcohol, a fluororesin, an acrylic resin, cellulose, or the like. Polyamide and polyimide are particularly preferable as the resin for forming the resin sheet 15 from the viewpoint of heat resistance and dielectric loss.

Next, a manufacturing method of the multilayer magnetic sheet 400 of the present embodiment will be described with reference to FIGS. 6 to 13. First, a manufacturing method of a magnetic sheet 100 constituting the multilayer magnetic sheet 400 and the laminate substrate 300 will be described.

Figure 6:
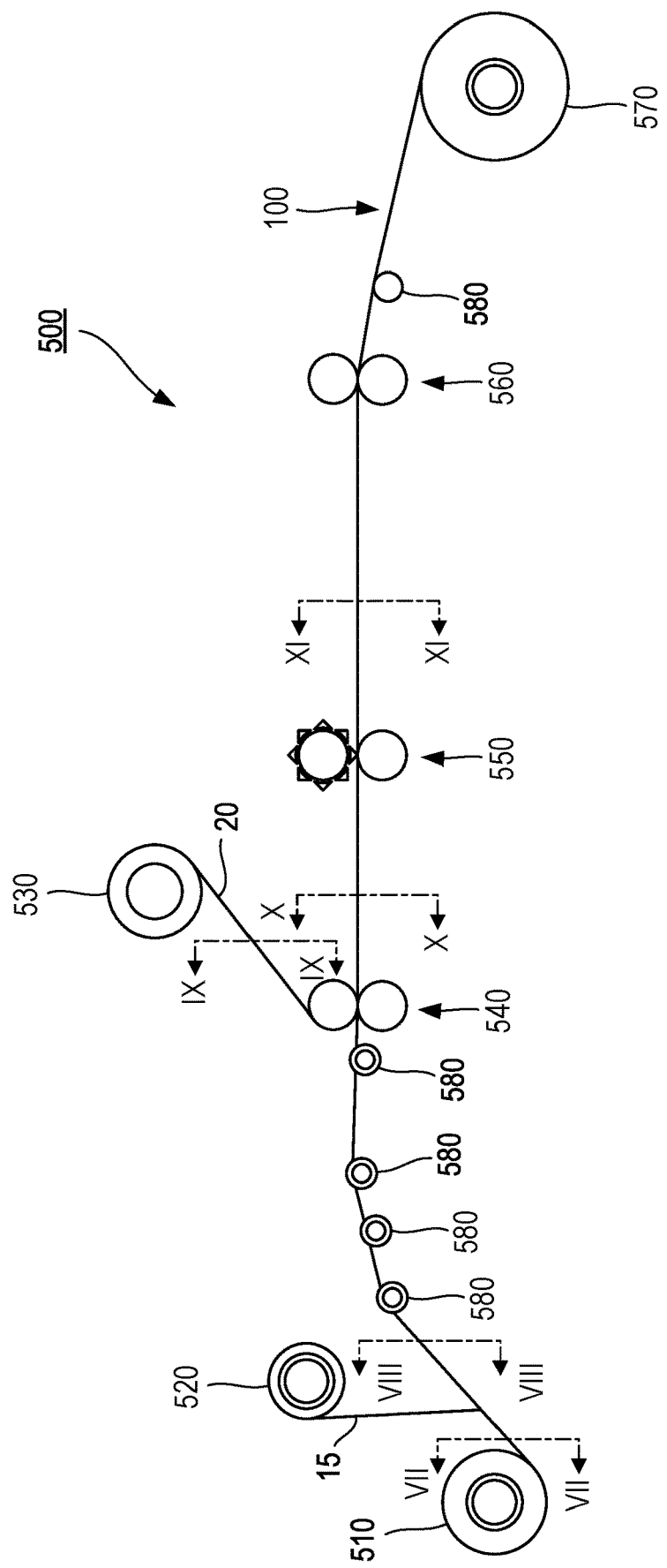
FIG. 6 is a schematic diagram illustrating a manufacturing method of a magnetic sheet.

FIG. 6 is a schematic diagram illustrating a manufacturing method of the magnetic sheet 100.

The magnetic sheet 100 is a magnetic sheet constituting the laminate substrate 300 and the multilayer magnetic sheet 400. The magnetic sheet 100 is manufactured using a manufacturing device 500 shown in FIG. 6. The manufacturing device 500 comprises a first unwinding roll 510, a first winding roll 520, a second unwinding roll 530, attaching rolls 540, crack rolls 550, flattening rolls 560, and a third winding roll 570 as main components from an upstream side to a downstream side along a manufacturing process. The manufacturing device 500 may further comprise a plurality of guide rolls 580. The guide roll 580 may be arranged as necessary even at a position not described.

Figure 7:
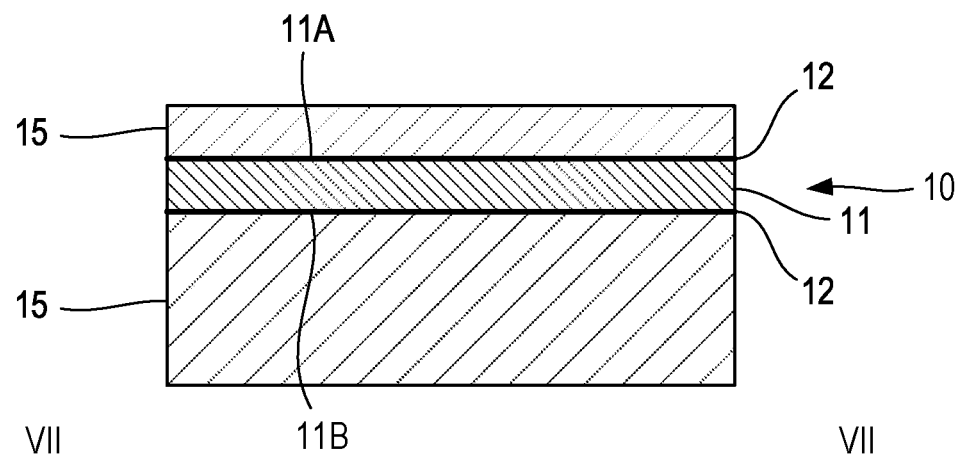
FIG. 7 is a cross-sectional view illustrating a configuration of a laminate body supplied from a first unwinding roll.

FIG. 7 is a cross-sectional view illustrating a configuration of the laminate body supplied from the first unwinding roll 510.

A laminate body in which the resin sheet 15 is stacked on each of the first surface 11A and the second surface 11B of the adhesive layer 10 as shown in FIG. 7 is wound around the first unwinding roll 510. The resin sheet 15 arranged on the first surface 11A is a protective sheet, and the resin sheet 15 arranged on the second surface 11B is also expressed as a liner. The resin sheet 15 arranged on the first surface 11A is a sheet having a smaller thickness than the resin sheet 15 arranged on the second surface 11B.

Figure 8:
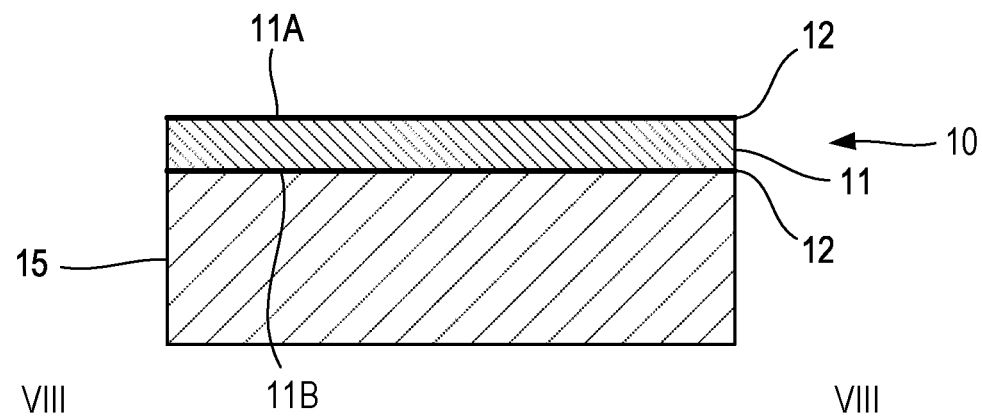
FIG. 8 is a cross-sectional view illustrating a configuration of a laminate body, which is supplied from the first unwinding roll and from which a resin sheet is peeled off.

FIG. 8 is a cross-sectional view illustrating a configuration of the laminate body, which is supplied from the first unwinding roll 510 and from which the resin sheet 15 is peeled off.

As shown in FIG. 8, the resin sheet 15 arranged on the first surface 11A is peeled off from the laminate body unwound from the first unwinding roll 510. As shown in FIG. 6, the peeled resin sheet 15 is wound around the first winding roll 520.

Figure 9:
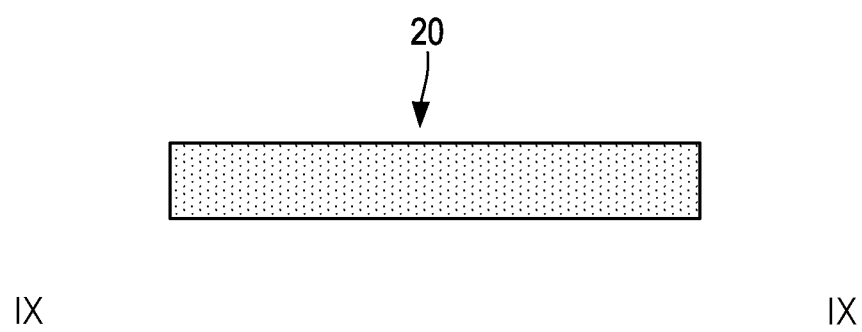
FIG. 9 is a cross-sectional view illustrating a configuration of a magnetic ribbon supplied from a second unwinding roll.

FIG. 9 is a cross-sectional view illustrating a configuration of the magnetic ribbon 20 supplied from the second unwinding roll 530.

The laminate body from which the resin sheet 15 arranged on the first surface 11A is peeled off is guided to the attaching rolls 540 by the plurality of guide rolls 580. The magnetic ribbon 20 unwound from the second unwinding roll 530 is also guided to the attaching rolls 540. As shown in FIG. 9, no crack 21 is formed in the magnetic ribbon 20 guided to the attaching rolls 540.

Here, a manufacturing method of the magnetic ribbon 20 unwound from the second unwinding roll 530 will be described. For example, a case where the magnetic ribbon 20 is a nanocrystalline alloy will be described. The magnetic ribbon 20 is manufactured by a manufacturing method comprising a process of rapidly cooling a molten alloy to obtain an amorphous alloy ribbon capable of nanocrystallization, and a heat treatment process of subjecting the amorphous alloy ribbon to heat treatment at a temperature equal to or higher than a crystallization onset temperature to form fine crystal grains.

The rapid cooling described above is performed by a single roll method in which a molten metal is discharged onto a rotating cooling roll and rapidly cooled and solidified. The magnetic ribbon 20 has an elongated shape in which a direction along a rotation direction of the cooling roll is a longitudinal direction. A length of the magnetic ribbon 20 in the longitudinal direction can be, for example, 20,000 m.

The temperature of the heat treatment described above varies depending on the alloy composition, but is generally 450° C. or higher. The fine crystal grains are, for example, Fe having a body-centered cubic lattice structure with solid solution of Si and the like. An analysis of the fine crystal grains can be performed using X-ray diffraction and a transmission electron microscope.

In the nanocrystalline alloy, at least 50 vol % of the nanocrystalline alloy is occupied by fine crystal grains having an average grain size of 100 nm or less as measured in the maximum dimension. A part other than the fine crystal grains in the nanocrystalline alloy is mainly noncrystalline. A proportion of the fine crystal grains may be substantially 100 vol %.

Figure 10:
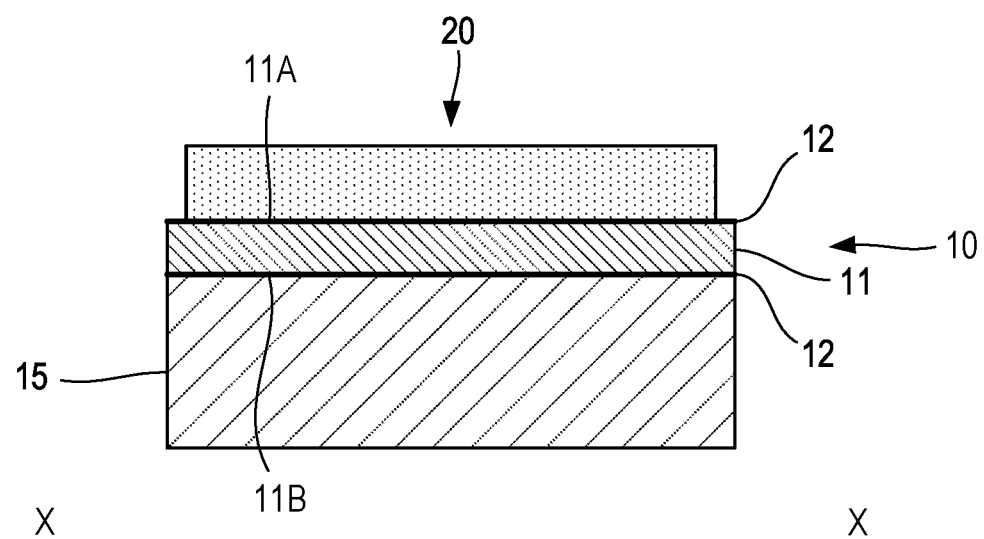
FIG. 10 is a cross-sectional view illustrating a state in which a magnetic ribbon is attached to the adhesive layer by attaching rolls.

FIG. 10 is a cross-sectional view illustrating a state in which the magnetic ribbon 20 is attached to the adhesive layer 10 by the attaching rolls 540.

As shown in FIG. 6, the attaching rolls 540 press and attach the magnetic ribbon 20 to the laminate body from which the resin sheet 15 has been peeled off. Specifically, the laminate body and the magnetic ribbon 20 are guided between two rolls arranged to oppose each other, and the magnetic ribbon 20 is pressed against and attached to the first surface 11A of the adhesive layer 10 using the two rolls as shown in FIG. 10.

The magnetic ribbon 20 may be arranged so that its center coincides with the center of the adhesive layer 10 in the width direction, or may be arranged so that the centers are away from each other. In this case, they are arranged so as to satisfy a relationship of 0 mm<gap a, and 0 mm<gap b (see FIG. 5). As shown in FIG. 6, the laminate body to which the magnetic ribbon 20 is attached is guided from the attaching rolls 540 to the crack rolls 550.

Figure 11:
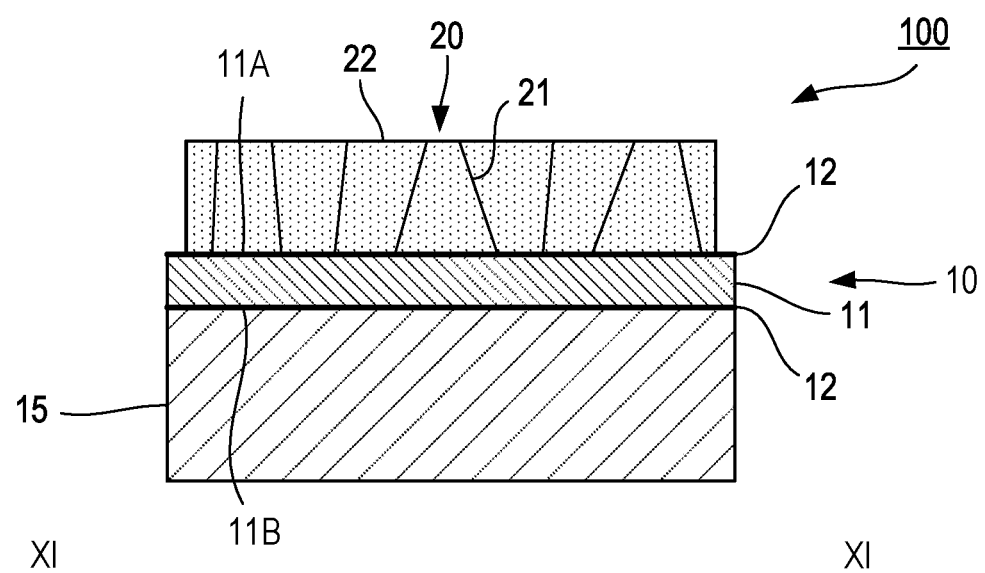
FIG. 11 is a cross-sectional view illustrating a state in which cracks are formed in a magnetic ribbon by crack rolls.

FIG. 11 is a cross-sectional view illustrating a state in which the cracks 21 are formed in the magnetic ribbon 20 by the crack rolls 550.

The crack rolls 550 form the cracks 21 in the magnetic ribbon 20 attached to the adhesive layer 10. Specifically, the laminate body to which the magnetic ribbon 20 is attached is guided between two rolls arranged to oppose each other, and of the two rolls, a roll provided with protrusions is pressed against the magnetic ribbon 20 to form the cracks 21 as shown in FIG. 11.

Of the two rolls, the roll not provided with protrusions is arranged on the laminate body side from which the resin sheet 15 is peeled off. The magnetic ribbon 20 in which the cracks 21 are formed includes the plurality of small pieces 22. The plurality of small pieces 22 are attached to the adhesive layer 10.

Here, a configuration of the crack rolls 550 will be described. The crack rolls 550 comprise a roll in which a plurality of convex members are arranged on a peripheral surface. A tip end of the convex member of the crack rolls 550 may be flat, conical, inverted conical with the center recessed, or cylindrical. The plurality of convex members may be arranged regularly or irregularly.

By pressing the elongated magnetic ribbon 20 against the crack rolls 550 or passing the elongated magnetic ribbon 20 between the two crack rolls 550, the cracks 21 are continuously formed in the magnetic ribbon 20. The convex members of the crack rolls 550 are pressed against a plurality of places on the surface of the magnetic ribbon 20, and a plurality of cracks 21 are formed in the magnetic ribbon 20.

In the formation of the cracks using the crack rolls 550, it is preferable to further form cracks connecting the plurality of cracks 21 in a mesh shape. Specifically, it is preferable to include a process of forming the plurality of cracks 21 by pressing the crack rolls 550 against the magnetic ribbon 20 and then forming cracks connecting the plurality of cracks 21 in a mesh shape.

For example, after the cracks 21 are formed by directly applying an external force to the magnetic ribbon 20 using the crack rolls 550, a second external force may be applied by means such as bending or winding the magnetic ribbon 20 to form cracks connecting the plurality of cracks 21 in a mesh shape. The cracks connecting the cracks 21 (magnetic gaps connecting the cracks) are formed by using the cracks 21 as starting points of brittle fracture and/or crack fracture.

In the process of forming the cracks connecting the plurality of cracks 21 in a mesh shape, the second external force as described above may not be applied. When the second external force is not applied, cracks connecting the plurality of cracks 21 in a mesh shape are formed in the process of forming the plurality of cracks 21.

The laminate body guided from the crack rolls 550 to the flattening rolls 560 is subjected to flattening treatment by the flattening rolls 560. The flattening rolls 560 are also expressed as shaping rolls.

Specifically, the laminate body is guided between two rolls arranged opposite to each other in the flattening rolls 560, and the laminate body is sandwiched and pressed by the two rolls. Thus, the surface of the magnetic ribbon 20 in which the cracks 21 are formed is flattened.

The laminate body after the flattening treatment becomes the magnetic sheet 100. The magnetic sheet 100 is guided to the third winding roll 570 via the guide roll 580. The magnetic sheet 100 is wound around the third winding roll 570.

Figure 12:
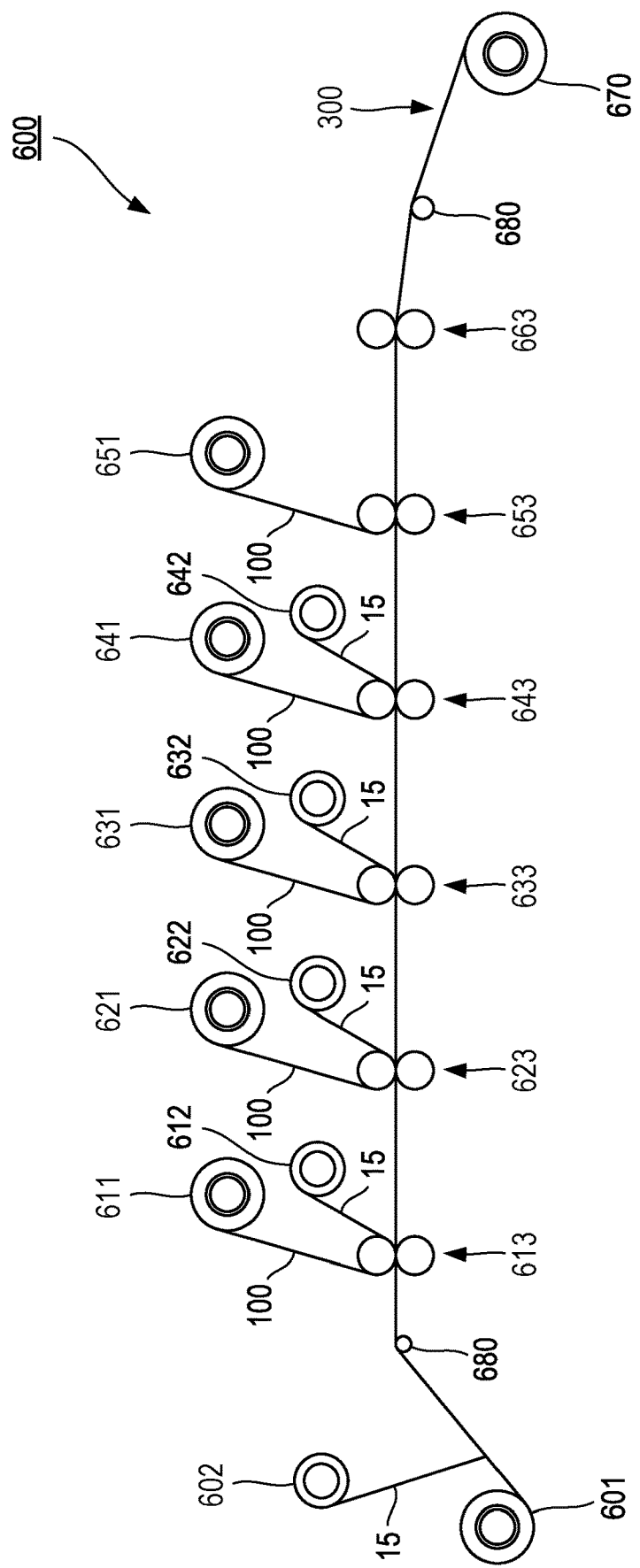
FIG. 12 is a schematic diagram illustrating a manufacturing method of the laminate substrate.

FIG. 12 is a schematic diagram illustrating a manufacturing method of the laminate substrate 300.

The laminate substrate 300 is manufactured using a manufacturing device 600 shown in FIG. 12. FIG. 12 shows the manufacturing device 600 that manufactures the laminate substrate 300 comprising five layers of the magnetic ribbons 20.

The manufacturing device 600 comprises a supply roll 601, a resin sheet winding roll 602, a first magnetic sheet unwinding roll 611, a first winding roll 612, first attaching rolls 613, a second magnetic sheet unwinding roll 621, a second winding roll 622, second attaching rolls 623, a third magnetic sheet unwinding roll 631, a third winding roll 632, third attaching rolls 633, a fourth magnetic sheet unwinding roll 641, a fourth winding roll 642, fourth attaching rolls 643, a fifth magnetic sheet unwinding roll 651, fifth attaching rolls 653, flattening rolls 663, and a laminate substrate winding roll 670 as main components from an upstream side to a downstream side along a manufacturing process. The manufacturing device 600 may further comprise a plurality of guide rolls 680. The guide roll 680 may be arranged as necessary even at a position not described.

The manufacturing device 600 may manufacture the laminate substrate 300 in which the number of the magnetic ribbons 20 is between 2 and 20 inclusive. In this case, the number of the first magnetic sheet unwinding roll 611 and the like is changed according to the number of the magnetic ribbons 20. The number of layers of the magnetic ribbons 20 may be determined appropriately. However, in the case of winding the laminate substrate 300, if the number of the layers of the magnetic ribbons 20 is large, it may become difficult to wind, or a shape defect may occur at the time of winding. Therefore, when the laminate substrate 300 is wound, the number of the layers is preferably 15 or less. The number of the layers is more preferably 10 or less. The number of the layers of the magnetic ribbons 20 is preferably 3 or more, preferably 4 or more, and more preferably 5 or more. Although it is also possible to produce the laminate substrate 300 having 20 layers or more, the device becomes so large. Therefore, 20 layers or less are preferable.

A laminate body in which the resin sheet 15 is stacked on each of the first surface 11A and the second surface 11B of the adhesive layer 10 as shown in FIG. 7 is wound around the supply roll 601.

As shown in FIG. 8, the resin sheet 15 arranged on the first surface 11A is peeled off from the laminate body unwound from the supply roll 601. As shown in FIG. 12, the peeled resin sheet 15 is wound around the resin sheet winding roll 602.

The laminate body from which the resin sheet 15 arranged on the first surface 11A is peeled off is guided to the first attaching rolls 613 by the guide roll 680. The magnetic sheet 100 unwound from the first magnetic sheet unwinding roll 611 is also guided to the first attaching rolls 613.

The first attaching rolls 613 press and attach the magnetic sheet 100 to the laminate body from which the resin sheet 15 has been peeled off. Specifically, the laminate body and the magnetic sheet 100 are guided between two rolls arranged to oppose each other, and the magnetic ribbon 20 of the magnetic sheet 100 is pressed against and attached to the first surface 11A of the adhesive layer 10 using the two rolls.

The magnetic ribbon 20 of the magnetic sheet 100 to be attached may be arranged so that its center coincides with the center of the adhesive layer 10 in the width direction, or may be arranged so that the centers are away from each other. In this case, they are arranged so as to satisfy the relationship of 0 mm<gap a, and 0 mm<gap b (see FIG. 5).

The resin sheet 15 of the magnetic sheet 100 attached by the first attaching rolls 613 is peeled off from the magnetic sheet 100 and wound around the first winding roll 612. The laminate body after the resin sheet 15 is wound around the first winding roll 612 is guided to the second attaching rolls 623. The magnetic sheet 100 unwound from the second magnetic sheet unwinding roll 621 is also guided to the second attaching rolls 623.

The second attaching rolls 623 press and attach the magnetic sheet 100 to the laminate body guided from the first attaching rolls 613. The magnetic ribbon 20 of the magnetic sheet 100 to be attached may be arranged so that its center coincides with the center of the adhesive layer 10 of the laminate body guided from the first attaching rolls 613 in the width direction, or may be arranged so that the centers are away from each other.

In this case, they are arranged so as to satisfy the relationship of 0 mm<gap a, and 0 mm<gap b (see FIG. 5). The resin sheet 15 of the magnetic sheet 100 attached by the second attaching rolls 623 is peeled off from the magnetic sheet 100 and wound around the second winding roll 622.

The laminate body after the resin sheet 15 is wound around the second winding roll 622 is guided to the third attaching rolls 633. The magnetic sheet 100 unwound from the third magnetic sheet unwinding roll 631 is also guided to the third attaching rolls 633.

The third attaching rolls 633 press and attach the magnetic sheet 100 to the laminate body guided from the second attaching rolls 623. The magnetic ribbon 20 of the magnetic sheet 100 to be attached may be arranged so that its center coincides with the center of the adhesive layer 10 of the laminate body guided from the second attaching rolls 623 in the width direction, or may be arranged so that the centers are away from each other.

In this case, they are arranged so as to satisfy the relationship of 0 mm<gap a, and 0 mm<gap b (see FIG. 5). The resin sheet 15 of the magnetic sheet 100 attached by the third attaching rolls 633 is peeled off from the magnetic sheet 100 and wound around the third winding roll 632.

The laminate body after the resin sheet 15 is wound around the third winding roll 632 is guided to the fourth attaching rolls 643. The magnetic sheet 100 unwound from the fourth magnetic sheet unwinding roll 641 is also guided to the fourth attaching rolls 643.

The fourth attaching rolls 643 press and attach the magnetic sheet 100 to the laminate body guided from the third attaching rolls 633. The magnetic ribbon 20 of the magnetic sheet 100 to be attached may be arranged so that its center coincides with the center of the adhesive layer 10 of the laminate body guided from the third attaching rolls 633 in the width direction, or may be arranged so that the centers are away from each other.

In this case, they are arranged so as to satisfy the relationship of 0 mm<gap a, and 0 mm<gap b (see FIG. 5). The resin sheet 15 of the magnetic sheet 100 attached by the fourth attaching rolls 643 is peeled off from the magnetic sheet 100 and wound around the fourth winding roll 642.

The laminate body after the resin sheet 15 is wound around the fourth winding roll 642 is guided to the fifth attaching rolls 653. The magnetic sheet 100 unwound from the fifth magnetic sheet unwinding roll 651 is also guided to the fifth attaching rolls 653.

The fifth attaching rolls 653 press and attach the magnetic sheet 100 to the laminate body guided from the fourth attaching rolls 643. The magnetic ribbon 20 of the magnetic sheet 100 to be attached may be arranged so that its center coincides with the center of the adhesive layer 10 of the laminate body guided from the fourth attaching rolls 643 in the width direction, or may be arranged so that the centers are away from each other.

In this case, they are arranged so as to satisfy the relationship of 0 mm<gap a, and 0 mm<gap b (see FIG. 5). The laminate body guided from the fifth attaching rolls 653 to the flattening rolls 663 is subjected to flattening treatment by the flattening rolls 663.

The relationship between the magnetic ribbon 20 and the adhesive layer 10 is preferably arranged so as to satisfy the relationship (see FIG. 5) of 0 mm<gap a, and 0 mm<gap b as described above. However, in the stacking process of the magnetic sheet 100 and the laminate body, deviation in the positional relationship may occur. When the deviation in the positional relationship occurs, for example, there can be a case in which the gap a becomes negative in the relationship between the magnetic ribbon 20 and the adhesive layer 10. That is, there can be a case in which the end of the magnetic ribbon 20 protrudes from the end of the adhesive layer 10 on one surface side of the magnetic ribbon 20. Even when the end of the magnetic ribbon 20 protrudes from the end of the adhesive layer 10 on the one surface side of the magnetic ribbon 20, a state in which the magnetic ribbon 20 is attached to the adhesive layer 10 can be maintained as long as the arrangement is made on the other surface side of the magnetic ribbon 20 so that the relationship between the magnetic ribbon 20 and the adhesive layer 10 satisfies the relationship of 0 mm<gap a, and 0 mm<gap b (see FIG. 5).

Figure 13:
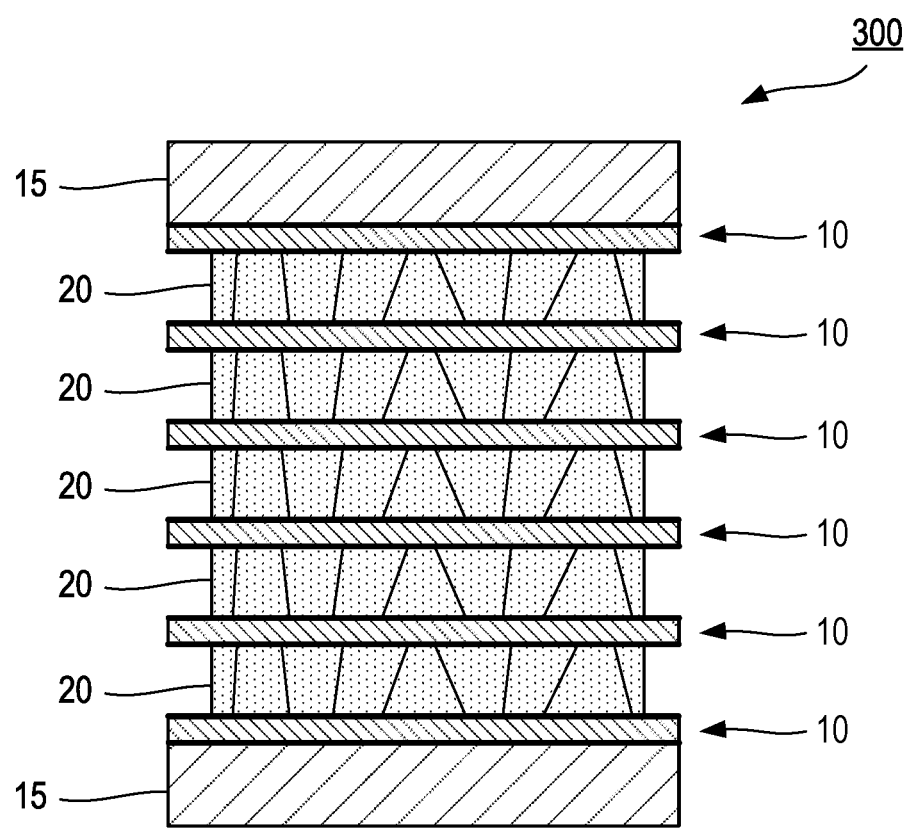
FIG. 13 is a cross-sectional view illustrating a configuration of the laminate substrate.

FIG. 13 is a cross-sectional view illustrating a configuration of the laminate substrate 300.

The laminate body after being subjected to the flattening treatment becomes the laminate substrate 300 shown in FIG. 13. The laminate substrate 300 is guided to the laminate substrate winding roll 670 via the guide roll 680. The laminate substrate 300 is wound around the laminate substrate winding roll 670.

A method of continuously cutting the laminate substrate 300 to a required length may be used in addition to the method of winding the laminate substrate 300 around the laminate substrate winding roll 670.

As shown in FIG. 1, the laminate substrate 300 manufactured by the manufacturing device 600 is cut so that the dimension in the direction in which the long side 300L extends becomes the length L. The cut laminate substrates 300 are arranged in a plate shape in the direction in which the short sides 300S extend. Examples of the number of the laminate substrates 300 that are arranged can include 14.

The laminate substrates 300 are stacked in the thickness direction as shown in FIG. 2. The multilayer magnetic sheet 400 is manufactured, for example, by stacking, in the thickness direction, the plurality of laminate substrates 300 formed in five plate shapes. When the laminate substrates 300 are stacked in the thickness direction, the resin sheets 15 are peeled off from the laminate substrates 300, and the adhesive layers 10 are attached to each other. The positions of the long sides 300L of the laminate substrates 300 adjacent to each other in the thickness direction are different by the distance D in the direction in which the short sides 300S extend.

EXAMPLE

Using the magnetic ribbon 20 (FT-3 manufactured by Hitachi Metals, Ltd. (now, Proterial, Ltd.), which is a Fe—Cu—Nb—Si—B based nanocrystalline alloy having a width of 30 mm, the laminate substrate 300 comprising five layers of the magnetic ribbons 20 and having Wr of 32 mm and L of 100 mm was produced, two of the laminate substrates 300 were arranged side by side in the configuration shown in FIG. 3, the distance D was set to 4 mm, and four layers thereof were stacked to produce a multilayer magnetic sheet 400. Example has a structure in which magnetic gaps are not continuous in the stacking direction. Cracks are formed in the magnetic ribbon 20.

As a Comparative Example, two of the laminate substrates 300 were arranged, the distance D was set to 0 mm, and four layers thereof were stacked to produce a multilayer magnetic sheet 400. Comparative Example has a structure in which magnetic gaps are continuous in the stacking direction. Cracks are formed in the magnetic ribbon 20.

In Example and Comparative Example, the magnetic permeability W and Q were evaluated. The results are shown in Table 1. The Example achieved the magnetic permeability three times higher or more, and Q two times larger or more than those of Comparative Example. It indicates that the present disclosure provides a multilayer magnetic sheet having excellent magnetic characteristics.

TABLE 1

|  | μ' | Q |
| --- | --- | --- |
| EXAMPLE | 880 | 15 |
| COMPARATIVE EXAMPLE | 232 | 6 |

A measurement method of the magnetic permeability μ' and Q is as follows.

Measurement Method of Magnetic Permeability μ' and Q

The multilayer magnetic sheets 400 of Example and Comparative Example were each punched into a ring shape having an outer diameter of 20 mm and an inner diameter of 9 mm, and used as a sample for evaluation. The sample for evaluation was punched out such that a boundary part where the two laminate substrates 300 were arranged side by side in the multilayer magnetic sheet 400 was an approximately diameter part of the ring-like shape. Using the sample for evaluation, impedance (Z) and inductance (LS) of a series equivalent circuit are measured at an OSC level of 0.03 V, a temperature of 25° C., and a frequency of 84 kHz using an impedance analyzer (E4990A manufactured by Keysight Technologies, and measurement jig: 16454A), and calculated on the basis of a following formula.

$$\mu' = 2\pi \times LS/(\mu 0 \times t \times n \times \ln(OD/ID))$$

Z: absolute value of impedance
t: ribbon thickness (m)
n: number of layers
μ0: vacuum magnetic permeability ($4 \times \pi \times 10^{-7}$ H/m)
OD: outer diameter (m)
ID: inner diameter (m)

$$Q = \mu'/\mu''$$

$$\mu'' = \sqrt{\mu r^2 - \mu'^2} \quad \text{[Formula 1]}$$

$$\mu r = 2\pi \times Z/(2\pi \times \mu 0 \times f \times t \times n \times \ln(OD/ID))$$

f: frequency (Hz)

With the multilayer magnetic sheet 400 having the above configuration, the wide multilayer magnetic sheet 400 is configured in which the plurality of laminate substrates 300 having two or more stacked layers of the magnetic ribbons 20 are arranged in the plate shape and stacked in the thickness direction. Since the plurality of laminate substrates 300 are arranged in the plate shape and the plurality of plate-shaped laminate substrates 300 are stacked in the thickness direction, the number of man-hours is less likely to become large as compared with a configuration in which the magnetic ribbons 20 are arranged side by side and stacked.

The positions of the long sides of the plurality of laminate substrates 300 are different by 0.5 mm or more between the laminate substrates 300 adjacent to each other in the stacking direction. In other words, when viewed in the stacking direction, gaps (also expressed as magnetic gaps) between the laminate substrates 300 arranged adjacent to the same surface are not aligned (also expressed as not continuous). Since the magnetic gaps are not continuous when viewed in the stacking direction, it is easy to prevent deterioration of magnetic characteristics in the multilayer magnetic sheet 400.

Since the positions of the long sides 300L of all the laminate substrates 300 are different when viewed in the stacking direction, the magnetic gaps, which are gaps between the laminate substrates 300 in the multilayer magnetic sheets 400, are less likely to become continuous in the stacking direction.

Since the positions of the ends in the direction in which the short sides 300S extend are different between the plate shapes in each of which the plurality of laminate substrates 300 are arranged side by side, the magnetic gaps, which are gaps in the multilayer magnetic sheets 400, are less likely to become continuous in the stacking direction.

By setting the width of the multilayer magnetic sheet 400 between 100 mm and 1000 mm inclusive and the length between 100 mm and 1000 mm inclusive, the multilayer magnetic sheet 400 can be formed into a desired size.

By making the magnetic ribbon 20 an amorphous alloy ribbon or a nanocrystalline alloy ribbon, it is possible to make the magnetic ribbon 20 a soft magnetic ribbon. The magnetic ribbon 20 can be formed using an alloy.

By including the plurality of small pieces 22 into the magnetic ribbon 20, the characteristics of the multilayer magnetic sheet 400 can be easily improved. Specifically, the Q value can be easily improved when the multilayer magnetic sheet 400 is used as a magnetic material for an inductor. In a case where the multilayer magnetic sheet 400 is used as a magnetic body for magnetic shielding, it is easy to divide the current path of the magnetic ribbon 20 to reduce the eddy current loss.

By providing the adhesive layer 10 between the adjacent magnetic ribbons 20, the adjacent magnetic ribbons 20 can be held by the adhesive layer 10.

By providing the two layers of the adhesive layers 10 between the adjacent magnetic ribbons 20, it is easy to stack the plurality of plate-shaped laminate substrates 300 in the thickness direction.

By providing the first stacking end part 401 or the second stacking end part 402 with the resin sheet 15, it becomes easy to protect the manufactured multilayer magnetic sheet 400. For example, when conveying the multilayer magnetic sheet 400 after manufactured, it is easy to prevent the adhesive layer 10 and the magnetic ribbon 20 from being damaged.

An amorphous alloy ribbon, a nanocrystalline alloy ribbon, another magnetic material, a metal foil such as aluminum, a resin sheet, or the like may be attached to the first stacking end part 401.

The width A of the region of the adhesive layer 10 where the adhesive 12 is provided is wider than the width B of the magnetic ribbon 20. When the magnetic ribbon 20 is attached to the adhesive layer 10, even if meandering occurs in the adhesive layer 10 or the magnetic ribbon 20, the adhesive 12 of the adhesive layer 10 can be easily arranged on the entire surface of the magnetic ribbon 20.

By setting the value obtained by subtracting the width B from the width A to 0.2 mm or more, it is easy to prevent occurrence of a part where the adhesive 12 is not arranged on the magnetic ribbon 20 when the magnetic ribbon 20 is attached to the adhesive layer 10. By setting the value obtained by subtracting the width B from the width A to 3 mm or less, it is easy to prevent the part of the magnetic sheet 100 where the magnetic ribbon 20 is not arranged from becoming large. When the magnetic sheets are arranged in parallel, it is easy to prevent the interval (magnetic gap) between the magnetic ribbons 20 from becoming large.

Since the width A and the width B have the relationship of the present disclosure, the adhesive 12 of the adhesive layer 10 can be easily arranged on the entire surface of the magnetic ribbon 20, thereby achieving an effect of being able to easily suppress falling of the small piece 22 formed by dividing the magnetic ribbon 20.

Second Embodiment

A multilayer magnetic sheet 410 according to a second embodiment of the present disclosure will be described with reference to FIGS. 14 and 15. A basic configuration of the multilayer magnetic sheet of the present embodiment is the same as that of the first embodiment. However, the second embodiment is different from the first embodiment in that a first laminate substrate and a second laminate substrate are stacked in the thickness direction and arranged. Therefore, regarding the present embodiment, only different configurations will be described with reference to FIGS. 14 and 15, and description of the same configurations will be omitted.

Figure 14:
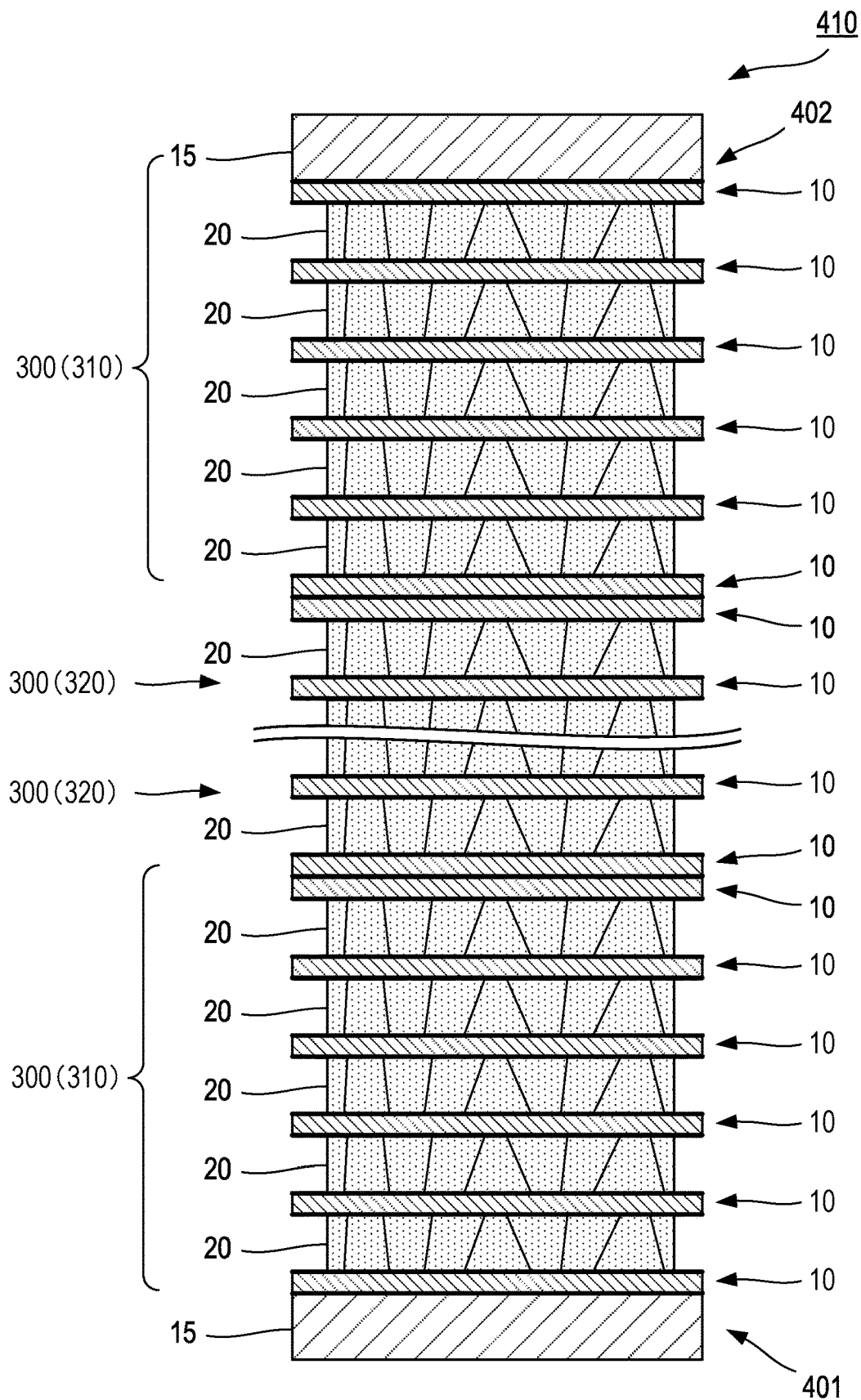
FIG. 14 is a cross-sectional view illustrating a structure of a multilayer magnetic sheet according to a second embodiment of the present disclosure.

FIG. 14 is a cross-sectional view illustrating a structure of the multilayer magnetic sheet 410.

As shown in FIG. 14, the multilayer magnetic sheet 410 comprises at least one first laminate substrate 310 and at least one second laminate substrate 320. Furthermore, the multilayer magnetic sheet 410 has a configuration in which the first laminate substrate 310 and the second laminate substrate 320 are stacked in the thickness direction and arranged.

The first laminate substrate 310 and the second laminate substrate 320 may be stacked alternately. A plurality of the first laminate substrates 310 or a plurality of the second laminate substrates 320 may be stacked continuously.

The first laminate substrate 310 and the second laminate substrate 320 have the same configuration. The first laminate substrate 310 and the second laminate substrate 320 have different arrangement directions when the multilayer magnetic sheet 410 is formed. The arrangement direction will be described later.

In a case of using the plurality of first laminate substrates 310, the numbers of the magnetic ribbons 20 stacked in the respective first laminate substrates 310 may be the same, or may be a combination of different numbers of the stacked layers of the magnetic ribbons 20. In a case of using the plurality of second laminate substrates 320, the numbers of the magnetic ribbons 20 stacked in the respective second laminate substrates 320 may be the same, or may be a combination of different numbers of the stacked layers of magnetic ribbons 20. The first laminate substrate 310 and the second laminate substrate 320 may have the same number of the stacked layers of the magnetic ribbons 20, or may have a combination of different numbers of the stacked layers of the magnetic ribbons 20.

When there is no need to distinguish the first laminate substrate 310 and the second laminate substrate 320, they are also expressed as the laminate substrate 300. The thickness direction is also expressed as a direction in which the plurality of laminate substrates 300 are stacked.

The multilayer magnetic sheet 410 is provided with the resin sheets 15. The resin sheet 15 is a film-like member formed using a resin arranged on each of a first stacking end part 401 and a second stacking end part 402, which are outer end parts in the thickness direction.

The number of the first laminate substrates 310 and the second laminate substrates 320 stacked in the thickness direction in the multilayer magnetic sheet 410 is preferably between 2 and 20 inclusive in total. The present embodiment has a configuration in which three of the first laminate substrates 310 and two of the second laminate substrates 320 are alternately stacked in the thickness direction. The number of the laminate substrates 300 stacked in the thickness direction in the multilayer magnetic sheet 410 may be more than 20.

The total number of the layers of the magnetic ribbons 20 stacked in the multilayer magnetic sheet 410 is preferably 10 or more, more preferably 15 or more, and still more preferably 25 or more. The total number of the stacked layers of the magnetic ribbons 20 is preferably 200 or less.

The laminate substrate 300 has a multilayer structure in which a plurality of adhesive layers 10 and a plurality of magnetic ribbons 20 are stacked alternately. In the present embodiment, an example of having a multilayer structure in which 6 layers of the adhesive layers 10 and 5 layers of the magnetic ribbons 20 are stacked alternately will be described.

The number of the layers of the magnetic ribbons 20 included in the laminate substrate 300 may be 5 as described above, or may be any number of between 2 and 20 inclusive other than 5.

The number of the layers of the magnetic ribbons 20 included in the laminate substrate 300 may be 20 or more. The number of the layers of the magnetic ribbons 20 included in the laminate substrate 300 is preferably 3 or more, more preferably 4 or more, and more preferably 5 or more. The number of the layers of the magnetic ribbons 20 is preferably 15 or less, and more preferably 10 or less.

Two layers of the adhesive layers 10 are continuously stacked at a position where the laminate substrates 300 are adjacent to each other in the thickness direction, for example, at a position where the first laminate substrate 310 and the second laminate substrate 320 are adjacent to each other in the thickness direction, or at a position where the two first laminate substrates 310 or the two second laminate substrates 320 are continuous in the thickness direction.

In other parts, two layers of the adhesive layers 10 may be stacked. Three or more layers of the adhesive layers 10 may be stacked, but thickness increases as a whole. Therefore, two or less layers are preferable when the adhesive layers 10 are stacked.

One layer of the resin sheet 15 is stacked on each of the laminate substrates 300 arranged at the first stacking end part 401 and the second stacking end part 402. In the case shown in FIG. 14, one layer of the resin sheet 15 is stacked on each of the first laminate substrates 310 arranged at the first stacking end part 401 and the second stacking end part 402. In other words, the multilayer magnetic sheet 410 is provided with the total of two layers of the resin sheets 15. The resin sheet 15 is attached to the adhesive layer 10 in the outermost layer.

The resin sheet 15 may not be stacked on the first stacking end part 401 or the second stacking end part 402. The magnetic ribbon 20 may be exposed, or for example, an amorphous alloy ribbon, a nanocrystalline alloy ribbon, another magnetic material, a metal foil such as aluminum, a resin sheet, or the like may be attached to the first stacking end part 401 or the second stacking end part 402.

Figure 15:
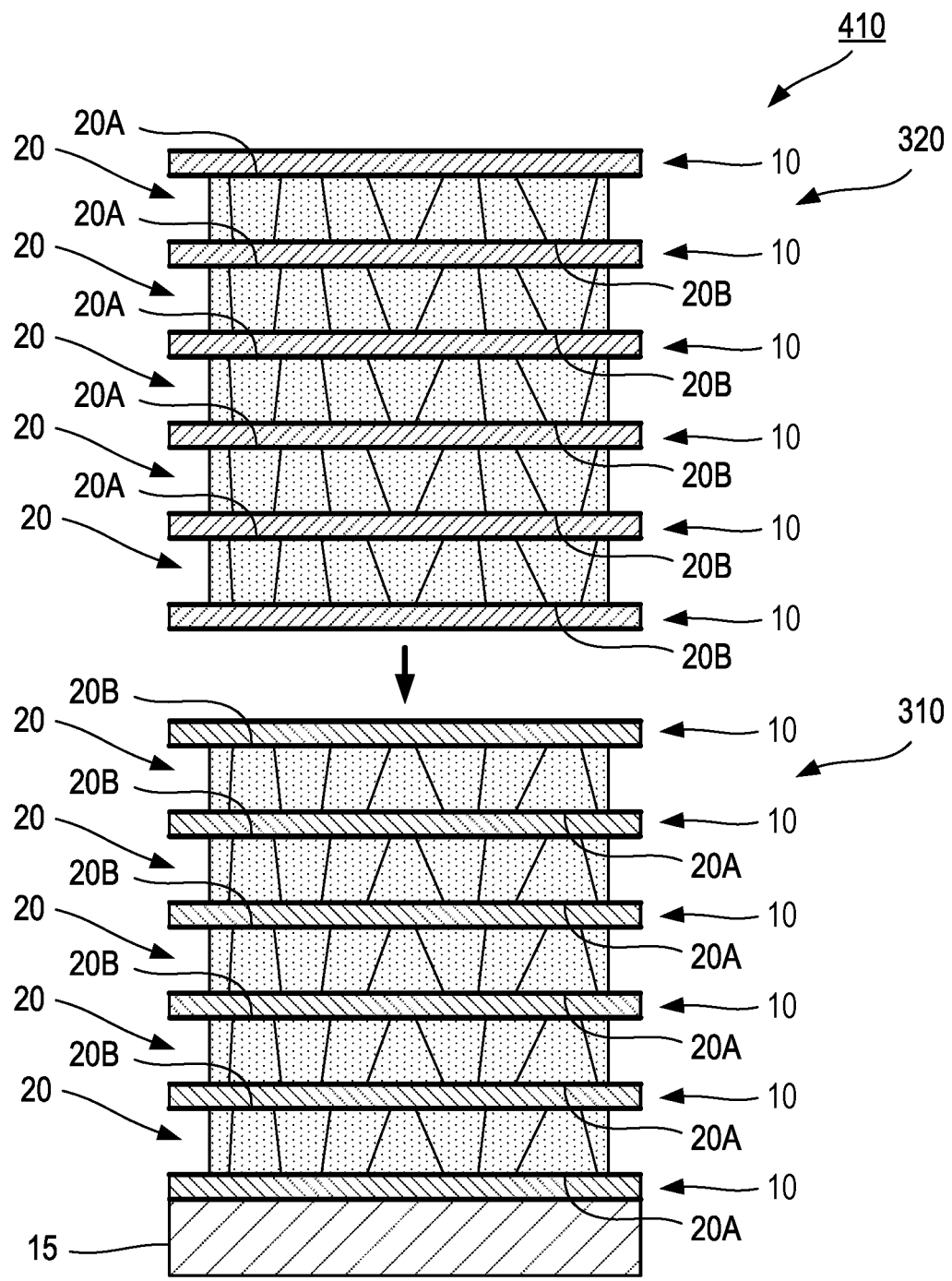
FIG. 15 is a schematic diagram illustrating a state in which a first laminate substrate and a second laminate substrate are stacked in a thickness direction.

FIG. 15 is a schematic diagram illustrating a state in which the first laminate substrate 310 and the second laminate substrate 320 are stacked in the thickness direction.

As shown in FIG. 15, the magnetic ribbons 20 included in the first laminate substrate 310 and the second laminate substrate 320 are each provided with a roll contact surface 20A and a free solidification surface 20B.

The plurality of magnetic ribbons 20 in the first laminate substrate 310 are arranged in the same arrangement direction, which is a direction from the roll contact surface 20A toward the free solidification surface 20B. The plurality of magnetic ribbons 20 in the second laminate substrate 320 are arranged in the same arrangement direction, which is a direction from the roll contact surface 20A toward the free solidification surface 20B.

The roll contact surface 20A is a surface of the magnetic ribbon 20 that is in contact with the cooling roll when manufactured by the single roll method. The free solidification surface 20B is a surface of the magnetic ribbon 20 that is not in contact with the cooling roll when manufactured by the single roll method. In other words, the free solidification surface 20B is a surface of the magnetic ribbon 20 opposite to the roll contact surface 20A.

The arrangement direction of the first laminate substrate 310 constituting the multilayer magnetic sheet 410 is opposite to the arrangement direction of the second laminate substrate 320. Specifically, the direction from the roll contact surface 20A toward the free solidification surface 20B in the magnetic ribbon 20 is reversed between the first laminate substrate 310 and the second laminate substrate 320.

Next, a manufacturing method of the multilayer magnetic sheet 410 of the present embodiment will be described. The manufacturing method of the multilayer magnetic sheet 410 from the manufacturing method of the magnetic sheet 100 to the manufacturing method of the laminate substrate 300 is the same as that in the first embodiment, and thus the description thereof will be omitted.

As shown in FIGS. 14 and 15, the laminate substrates 300 manufactured by the manufacturing device 600 are stacked in the thickness direction such that the arrangement direction of the first laminate substrate 310 and the arrangement direction of the second laminate substrate 320 are opposite to each other. For example, the multilayer magnetic sheet 410 is manufactured by alternately stacking the three first laminate substrates 310 and the two second laminate substrates 320 in the thickness direction. The total number of the layers of the magnetic ribbons 20 included in the multilayer magnetic sheet 410 is preferably 15 or more. When stacked in the thickness direction, the resin sheets 15 are peeled off from the first laminate substrate 310 and the second laminate substrate 320, and the adhesive layers 10 are attached to each other.

Regarding the laminate substrates 300 manufactured by the manufacturing device 600, the arrangement directions of the first laminate substrate 310 and the second laminate substrate 320 may be the same, and when the first laminate substrate 310 and the second laminate substrate 320 are stacked, they can be stacked such that the arrangement directions thereof are reversed.

EXAMPLE

Using a magnetic ribbon 20 (FT-3 manufactured by Hitachi Metals, Ltd. (now, Proterial, Ltd.)), which is a Fe—Cu—Nb—Si—B based nanocrystalline alloy having a width of 30 mm, as shown in FIG. 13, a plurality of laminate substrates 300 each having five layers of the magnetic ribbons 20 and having a width of 32 mm and a length of 100 mm were produced. A thickness of one end and a thickness of the other end of each of 10 laminate substrates 300 were measured, and a difference was calculated. The difference between the thickness at one end and the thickness at the other end was 7 μm on average. The one end is a position corresponding to one end of the magnetic ribbon 20 in the width direction, and the other end is a position corresponding to the other end of the magnetic ribbon 20 in the width direction. The width direction of the magnetic ribbon 20 is a direction orthogonal to the longitudinal direction of the magnetic ribbon 20.

Next, as shown in FIG. 14, five laminate substrates 300 were stacked to produce the multilayer magnetic sheet 410.

In Example, the five laminate substrates 300 were stacked so that the arrangement direction, which is the direction from the roll contact surface 20A toward the free solidification surface 20B, was reversed alternately.

In Comparative Example, stacking was performed such that all the arrangement directions, which are directions from the roll contact surface 20A toward the free solidification surface 20B, were the same.

Four Examples and four Comparative Examples were produced, the thickness at one end and the thickness at the other end were measured, the difference was calculated, and the average was obtained. The magnetic permeability W and the Q value were measured, and the averages thereof were obtained. The results are shown in Table 2. As shown in Table 2, in Example, it was possible to significantly reduce the difference in thickness between one end and the other end. The magnetic permeability and the Q value were almost the same, but those in Examples were slightly improved.

TABLE 2

| | Difference between Thickness of One End and Thickness of Other End | μ' | μ'' | Q |
|---|---|---|---|---|
| EXAMPLE | 5 μm | 1077 | 70.6 | 15.3 |
| COMPARATIVE EXAMPLE | 32 μm | 1070 | 72.8 | 14.8 |

In the multilayer magnetic sheet 410 having the above configuration, the arrangement direction of the first laminate substrate 310 constituting the multilayer magnetic sheet 410 and the arrangement direction of the second laminate substrate 320 are opposite. Specifically, the direction from the roll contact surface 20A toward the free solidification surface 20B in the magnetic ribbon 20 is opposite between the first laminate substrate 310 and the second laminate substrate 320.

Even if the thickness of the magnetic ribbon 20 is not uniform, by reversing the arrangement directions between the first laminate substrate 310 and the second laminate substrate 320, the entire thickness of the included magnetic ribbons 20 can be easily uniformed when seen as the multilayer magnetic sheet 410. In other words, the dimension in the thickness direction can be easily set within a predetermined range.

Specifically, by reversing the arrangement direction of the magnetic ribbons 20 between the first laminate substrate 310 and the second laminate substrate 320, a part having a large dimension and a part having a small dimension in the thickness direction of the magnetic ribbon 20 can be easily overlapped as compared with a case where the arrangement direction is not reversed. In other words, it is easy to absorb variation in the dimension in the thickness direction of the magnetic ribbon 20.

An example in which the thickness dimension of one end of the magnetic ribbon 20 in the width direction is large and the thickness dimension of the other end on the opposite side is small is as follows. By reversing the arrangement direction of the magnetic ribbon 20, the other end of the magnetic ribbon 20 in the second laminate substrate 320 is overlapped on one end of the magnetic ribbon 20 in the first laminate substrate 310. Thus, variations in the dimension in the thickness direction of the magnetic ribbon 20 can be absorbed. Therefore, it is easy to suppress deterioration of the function as the multilayer magnetic sheet 410 due to the variation in the dimension in the thickness direction of the magnetic ribbon 20.

Variation in the dimension in the thickness direction of the entire magnetic ribbons 20 included in the multilayer magnetic sheet 410 can be easily set within a predetermined range. For example, when the predetermined range is the same, it is easy to increase a tolerance range of the thickness dimension required for a single magnetic ribbon 20. As an example, in the single magnetic ribbon 20 having a thickness of 16 μm, the tolerance range of the difference of the thickness dimension along the width direction, which has been 2 μm or less, can be easily relaxed to a value larger than 2 μm.

In other words, even when the magnetic ribbon 20 having a large tolerance range of the thickness dimension is used, variations in the dimension in the thickness direction of the entire magnetic ribbons 20 included in the multilayer magnetic sheet 410 are easily set within the predetermined range.

Thus, the magnetic ribbon 20 having a thickness dimension, which is larger than the tolerance range to an extent that it has not been able to be used for manufacturing of the multilayer magnetic sheet 410, becomes possible to be used for manufacturing. For example, it becomes easy to suppress deterioration in yield in manufacturing of the multilayer magnetic sheet 410.

It is possible to simplify or eliminate a process of managing the thickness of the magnetic ribbon 20 and a process of selecting in the manufacturing of the multilayer magnetic sheet 410. In other words, it becomes easy to suppress an increase in manufacturing processes for the multilayer magnetic sheet 410.

By providing the adhesive layer 10 between the adjacent magnetic ribbons 20, the adjacent magnetic ribbons 20 can be held by the adhesive layer 10. Specifically, the adhesive 12 provided on the first surface 11A of the support 11 adheres to one of the adjacent magnetic ribbons 20, and the adhesive 12 provided on the second surface 11B adheres to the other of the adjacent magnetic ribbons 20.

The technical scope of the present disclosure is not limited to the above embodiments, and various modifications can be made without departing from the gist of the present disclosure. For example, the multilayer magnetic sheets 400 and 410 according to the present disclosure can be used for an inductive element and the like.

What is claimed is:

1. A multilayer magnetic sheet comprising:
laminate substrates each comprising two or more stacked layers of band-shaped magnetic ribbons and having a short side and a long side, wherein
the laminate substrates are arranged side by side in a plate shape in a direction in which the long sides of the laminate substrates are adjacent to each other and the short sides of the laminate substrates extend, and the plate shapes each provided by the laminate substrates arranged side by side are stacked in a thickness direction of the laminate substrate,
ten or more layers of the magnetic ribbons are stacked in total,
positions of the long sides of the laminate substrates adjacent to each other in a direction in which the laminate substrates are stacked in their thickness direction are different and separated from each other by 0.5 mm or more in the direction in which the short sides extend, and
two or more layers of adhesive layers are arranged between the laminate substrates adjacent to each other in the direction in which the laminate substrates are stacked in their thickness direction, the adhesive layers each comprising a support formed in a band shape and an adhesive provided on each of a first surface and a second surface of the support.

2. The multilayer magnetic sheet according to claim 1, wherein the positions of the long sides of all the laminate substrates are different from each other when viewed in the direction in which the laminate substrates are stacked.

3. The multilayer magnetic sheet according to claim 1, wherein ends of the plate shapes each provided by the laminate substrates arranged side by side in the direction in which the short sides extend are different from each other in the direction in which the short sides extend between the plate shapes adjacent to each other in the direction in which the laminate substrates are stacked.

4. The multilayer magnetic sheet according to claim 1, wherein the multilayer magnetic sheet has a width of between 100 mm and 1000 mm inclusive and a length of between 100 mm and 1000 mm inclusive.

5. The multilayer magnetic sheet according to claim 1, wherein at least one of the magnetic ribbons is an amorphous alloy ribbon or a nanocrystalline alloy ribbon.

6. The multilayer magnetic sheet according to claim 1, wherein at least one of the magnetic ribbons is a nanocrystalline alloy ribbon and comprises small pieces.

7. The multilayer magnetic sheet according to claim 1, further comprising another adhesive layer between the adjacent magnetic ribbons in the laminate substrate, the other adhesive layer comprising a support formed in a band shape and an adhesive provided on each of a first surface and a second surface of the support.

8. The multilayer magnetic sheet according to claim 7, wherein, in at least one of the laminate substrates, a width A of the other adhesive layer in a direction intersecting a longitudinal direction thereof and a width B of the magnetic ribbon in a direction intersecting a longitudinal direction thereof satisfy a relationship of 0.2 mm≤(width A−width B)≤3 mm.

9. The multilayer magnetic sheet according to claim 1, further comprising:
a different adhesive layer comprising a support formed in a band shape and an adhesive provided on each of a first surface and a second surface of the support; and
a resin sheet attached to the different adhesive layer, the resin sheet being a film member made of a resin, wherein
the different adhesive layer and the resin sheet are provided on a first magnetic ribbon at a first stacking end of the magnetic ribbons or on a second magnetic ribbon at a second stacking end of the magnetic ribbons opposite to the first stacking end in the direction in which the laminate substrates are stacked.

10. The multilayer magnetic sheet according to claim 9, wherein, in at least one of the laminate substrates, a width A of the different adhesive layer in a direction intersecting a longitudinal direction thereof and a width B of the magnetic ribbon in a direction intersecting a longitudinal direction thereof satisfy a relationship of 0.2 mm≤(width A−width B)≤3 mm.

11. The multilayer magnetic sheet according to claim 1, wherein, in at least one of the laminate substrates, a width A of the adhesive layers in a direction intersecting a longitudinal direction thereof and a width B of the magnetic ribbon in a direction intersecting a longitudinal direction thereof satisfy a relationship of 0.2 mm≤(width A−width B)≤3 mm.

* * * * *